United States Patent
Iwai et al.

(10) Patent No.: US 11,515,966 B2
(45) Date of Patent: Nov. 29, 2022

(54) TRANSMISSION DEVICE, RECEPTION DEVICE, TRANSMISSION METHOD, AND RECEPTION METHOD

(71) Applicant: Panasonic Intellectual Property Corporation of America, Torrance, CA (US)

(72) Inventors: Takashi Iwai, Ishikawa (JP); Tetsuya Yamamoto, Kanagawa (JP); Tomoya Nunome, Ishikawa (JP); Tomofumi Takata, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 61 days.

(21) Appl. No.: 16/964,485

(22) PCT Filed: Dec. 26, 2018

(86) PCT No.: PCT/JP2018/047814
§ 371 (c)(1),
(2) Date: Jul. 23, 2020

(87) PCT Pub. No.: WO2019/159548
PCT Pub. Date: Aug. 22, 2019

(65) Prior Publication Data
US 2021/0036807 A1 Feb. 4, 2021

(30) Foreign Application Priority Data
Feb. 16, 2018 (JP) .............................. JP2018-025857

(51) Int. Cl.
*H04L 1/08* (2006.01)
*H04W 72/14* (2009.01)

(52) U.S. Cl.
CPC .............. *H04L 1/08* (2013.01); *H04W 72/14* (2013.01)

(58) Field of Classification Search
None
See application file for complete search history.

(56) References Cited

U.S. PATENT DOCUMENTS 8,683,284 B2 * 3/2014 Fujii ..................... H04L 1/1893
714/748
2016/0269146 A1 9/2016 Sun et al.
(Continued)

FOREIGN PATENT DOCUMENTS

| EP | 1775872 A2 * | 4/2007 | ....... H04L 25/03159 |
| JP | WO2016/163505 A1 | 2/2018 | |
| WO | 2016/163505 A1 | 10/2016 | |

OTHER PUBLICATIONS

3GPP TR 38.913 V14.3.0, "3rd Generation Partnership Project; Technical Specification Group Radio Access Network; Study on Scenarios and Requirements for Next Generation Access Technologies; (Release 14)," Jun. 2017, 39 pages.
(Continued)

*Primary Examiner* — Hong S Cho
(74) *Attorney, Agent, or Firm* — Seed IP Law Group LLP

(57) ABSTRACT

According to the present invention, a base station can dynamically change a repetition transmission method as appropriate. In a base station (100), a repetition control unit (103) determines a data repetition pattern for a terminal (200). A transmission unit (109) repeatedly transmits data (repetition transmission) on the basis of the repetition pattern. The data repetition pattern corresponds to control information to be reported to the terminal (200) by dynamic signaling.

11 Claims, 17 Drawing Sheets

(56) References Cited

U.S. PATENT DOCUMENTS

| | | | |
|---|---|---|---|
| 2018/0115925 A1* | 4/2018 | Moroga | H04W 72/1257 |
| 2018/0219649 A1* | 8/2018 | Ying | H04L 1/1819 |
| 2020/0267670 A1* | 8/2020 | Strom | H04W 48/10 |

OTHER PUBLICATIONS

3GPP TS 38.212 V15.0.0, "3rd Generation Partnership Project; Technical Specification Group Radio Access Network; NR; Multiplexing and channel coding (Release 15)," Dec. 2017, 82 pages.
Huawei, HiSilicon, "On supporting ultra-reliability in a resource efficient way," R1 1719404, Agenda Item: 7.3.3.7, 3GPP TSG RAN WG1 Meeting # 91, Reno, USA, Nov. 17-Dec. 1, 2017, 5 pages.
International Search Report, dated Mar. 5, 2019, for corresponding International Application No. PCT/JP2018/047814, 4 pages.

* cited by examiner

Number of repetitions = 4, Transmission time interval = 0

Number of repetitions = 4, Transmission time interval = 1

| Number of allocated PRBs | Number of data repetitions |
|---|---|
| > X [PRB] | 2 |
| ≤ X [PRB] | 4 |

FIG. 14

| Number of symbols | Number of data repetitions |
|---|---|
| > X [symbol] | 2 |
| ≤ X [symbol] | 4 |

FIG. 15

| SCS of UL/DL data | Number of data Repetitions [transmission unit] | Transmission interval [transmission unit] |
|---|---|---|
| 15 kHz | 2 | 0 |
| 30 kHz | 2 | 1 |
| 60 kHz | 4 | 1 |

| SCS of UL/DL data | Number of data Repetitions [transmission unit] | Transmission interval [transmission unit] |
|---|---|---|
| 15 kHz | 2 | 0 |
| 30 kHz | 2 | 1 |
| 60 kHz | 3 | 2 |

| SCS of UL/DL data | Number of data Repetitions [transmission unit] | RV order |
|---|---|---|
| 15 kHz | 2 | {0, 3} |
| 30 kHz | 2 | {0, 3} |
| 60 kHz | 4 | {0, 2, 3, 1} |

FIG. 20

| SUL or non-SUL | Number of data repetitions |
|---|---|
| SUL | 2 |
| non-SUL | 4 |

FIG. 23

| Signaling Information (1 bit) | Number of allocated PRBs | Number of data repetitions |
|---|---|---|
| 0 | > X [PRB] | 1 |
| 1 | | 4 |
| 0 | ≦ X [PRB] | 2 |
| 1 | | 8 |

FIG. 24

| SUL or non-SUL | Candidates of repettition pattern |
|---|---|
| SUL | {1, 2, 4, 8} |
| non-SUL | {1, 4, 16, 32} |

FIG. 25

TRANSMISSION DEVICE, RECEPTION DEVICE, TRANSMISSION METHOD, AND RECEPTION METHOD

TECHNICAL FIELD

The present disclosure relates to a transmission apparatus, a reception apparatus, a transmission method, and a reception method.

BACKGROUND ART

In the standardization of 5G, a new radio access technique (New Radio (NR)) that is not necessarily backward compatible with LTE/LTE-Advanced has been discussed in 3 GPP.

In the NR, technical studies targeting Ultra-Reliable and Low Latency Communications (URLLC), which is one of the requirements of 5G, have been carried out. URLLC is required to satisfy at the same time the "high reliability" of a packet transmission error rate of $10^{-5}$ or less for a packet data amount of 32 bytes (packet transmission success rate of 99.999% or more) and the "low latency" of 1 ms or less for a radio interval (see Non-Patent Literature 1, for example).

In order to satisfy the requirements of URLLC mentioned above, it has been studied to repeatedly transmit (or perform repetition transmission on) packet data generated in a prescribed time unit (e.g., 0.5 ms slot unit (subcarrier spacing is equal to 30 kHz) or 0.25 ms slot unit (subcarrier spacing is equal to 60 kHz)) (see Non-Patent Literature 2, for example). The receiving side can reduce the packet transmission error rate by combining signals subjected to the repetition transmission. Further, the transmitting side can reduce the latency by repeatedly transmitting packet data without waiting for feedback information including retransmission control information from the receiving side. In addition, the repetition transmission can be applied to both an uplink data channel (PUSCH: Physical Uplink Shared Channel) and a downlink data channel (PDSCH: Physical Downlink Shared Channel).

In Non-Patent Literature 2, different repetition transmission methods targeting URLLC are studied as shown in FIGS. 1A and 1B. Further, Non-Patent Literature 2 describes that an optimal repetition transmission method dynamically changes depending on a radio channel status, a traffic amount, or the like of each terminal.

For example, the repetition transmission method shown in (a) of FIG. 1 is a repetition transmission method suitable for when delay Buffer budget (the remaining time from the first packet transmission (for example, timing #n) to the requested packet delay budget timing) is small. Specifically, in (a) of FIG. 1, packets are repeatedly transmitted in a continuous time (timing #n, #(n+1)). Performing repetition transmission without a non-transmission section (gap section) as described above makes it possible to reduce latency. On the other hand, in the transmitting side, a reception status cannot be fully considered, so that excessive radio resource allocation may occur for repetition data, which may reduce the utilization efficiency of a radio resource.

The repetition transmission method shown in (b) of FIG. 1 is a repetition transmission method suitable for when delay Buffer budget is large. In (b) of FIG. 1, packets are repeatedly transmitted in a non-continuous time (timing #n, #(n+2)) including a gap section. The transmitting side can efficiently allocate a radio resource with respect to the second and subsequent repetition data by receiving feedback information from the receiving side in the gap section. For example, when a packet decoding was OK (no error), the receiving side can use the feedback information to instruct the stop of the subsequent repetition transmission. Further, when the packet decoding was NG (error exists), the receiving side can use the feedback information to instruct the subsequent repetition transmission to allocate the frequency resource necessary for the packet decoding to be OK.

CITATION LIST

Non-Patent Literature

Non-Patent Literature 1: 3GPP TR 38.913 V14.3.0, "Study on Scenarios and Requirements for Next Generation Access Technologies (Release 14)" (2017 June)
Non-Patent Literature 2: R1-1719404, "On supporting ultra-reliability in a resource efficient way", Huawei, HiSilicon, December 2017
Non-Patent Literature 3: 3GPP TR 38.212 V15.0.0, "NR Multiplexing and channel coding (Release 15)" (2017 December)

SUMMARY OF INVENTION

The Buffer budget of each terminal described above varies with time depending on the scheduling timing of packets. Therefore, it is necessary to study how to dynamically change a repetition transmission method to be applied to each terminal.

One aspect of the present disclosure facilitates providing a transmission apparatus, a reception apparatus, a transmission method, and a reception method that can dynamically change a repetition transmission method appropriately.

A transmission apparatus according to one general aspect of the present disclosure includes: determination circuitry, which, in operation, determines a repetition pattern of data for a terminal; and transmission circuitry, which, in operation, transmits the data repeatedly based on the repetition pattern, wherein the repetition pattern is associated with control information indicated to the terminal by dynamic signaling.

A reception apparatus according to one general aspect of the present disclosure includes: determination circuitry, which, in operation, determines a repetition pattern of data for a terminal; reception circuitry, which, in operation, receives the data that is transmitted repeatedly based on the repetition pattern; and decoding circuitry, which, in operation, combines the data transmitted repeatedly, wherein the repetition pattern is associated with control information indicated to the terminal by dynamic signaling.

A transmission method according to one general aspect of the present disclosure includes: determining a repetition pattern of data for a terminal; and transmitting the data repeatedly based on the repetition pattern, wherein the repetition pattern is associated with control information indicated to the terminal by dynamic signaling.

A reception method according to one general aspect of the present disclosure includes: determining a repetition pattern of data for a terminal; receiving the data that is transmitted repeatedly based on the repetition pattern; and combining the data transmitted repeatedly, wherein the repetition pattern is associated with control information indicated to the terminal by dynamic signaling.

It should be noted that these general or specific aspects may be implemented as a system, an apparatus, a method, an integrated circuit, a computer program, a storage medium, or any selective combination thereof.

According to one general aspect of the present disclosure, it is possible to dynamically change a repetition transmission method appropriately.

Additional benefits and advantages of one general aspect of the present disclosure will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 14 is a diagram showing an example of a correspondence relationship between a frequency allocation bandwidth and the number of repetitions.

FIG. 15 is a diagram showing an example of a correspondence relationship between the number of symbols to be transmitted and the number of repetitions.

FIG. 20 is a diagram showing another example of the correspondence relationship between the SCS and the repetition pattern.

FIG. 23 is a diagram showing an example of a correspondence relationship between an uplink channel type and the number of repetitions.

FIG. 24 is a diagram showing an example of a correspondence relationship between signaling information, a frequency allocation bandwidth, and the number of repetitions.

FIG. 25 is a diagram showing an example of a correspondence relationship between an uplink channel type and a candidate of the number of repetitions.

DESCRIPTION OF EMBODIMENTS

Hereinafter, embodiments of the present disclosure will be described in detail with reference to the accompanying drawings.

Data channel allocation information (such as radio resource allocation information, Modulation and Coding Scheme (MCS), etc.) determined by a base station (referred to as eNB or gNB) in accordance with a radio channel status of a terminal (referred to as User Equipment (UE)) is included in control information (Downlink Control Information (DCI)) and is indicated from the base station to the terminal using Physical Downlink Control Channel (PDCCH). Similarly, a repetition transmission method (the number of repetitions, or a repetition pattern of a gap section or the like) applied by the base station to the terminal may be included in the DCI and transmitted from the base station to the terminal using PDCCH.

On the other hand, in PDCCH, in particular, for URLLC (NR-PDCCH), a lower error rate is required in order to control packets for URLLC for which high reliability is required. In order to reduce the transmission error rate of NR-PDCCH, a DCI format size indicated by NR-PDCCH needs to be made smaller.

Therefore, it is necessary to indicate an appropriate repetition transmission method in accordance with the radio channel status of the terminal with a small amount of control information.

Therefore, in one aspect of the present disclosure, a method of dynamically indicating a repetition pattern in accordance with a radio channel status of a terminal while suppressing an increase in an amount of control information will be described.

Overview of Communication System

A communication system according to an embodiment of the present disclosure includes base station 100 and terminal 200 that transmit and receive repetition data using a downlink data channel (PDSCH), and/or, base station 300 and terminal 400 that transmit and receive repetition data using an uplink data channel (PUSCH). Note that one base station may have both configurations of base station 100 and base station 300, or may have either configuration thereof. Similarly, one terminal may have both configurations of terminal 200 and terminal 400, or may have either configuration thereof.

Figure 1:
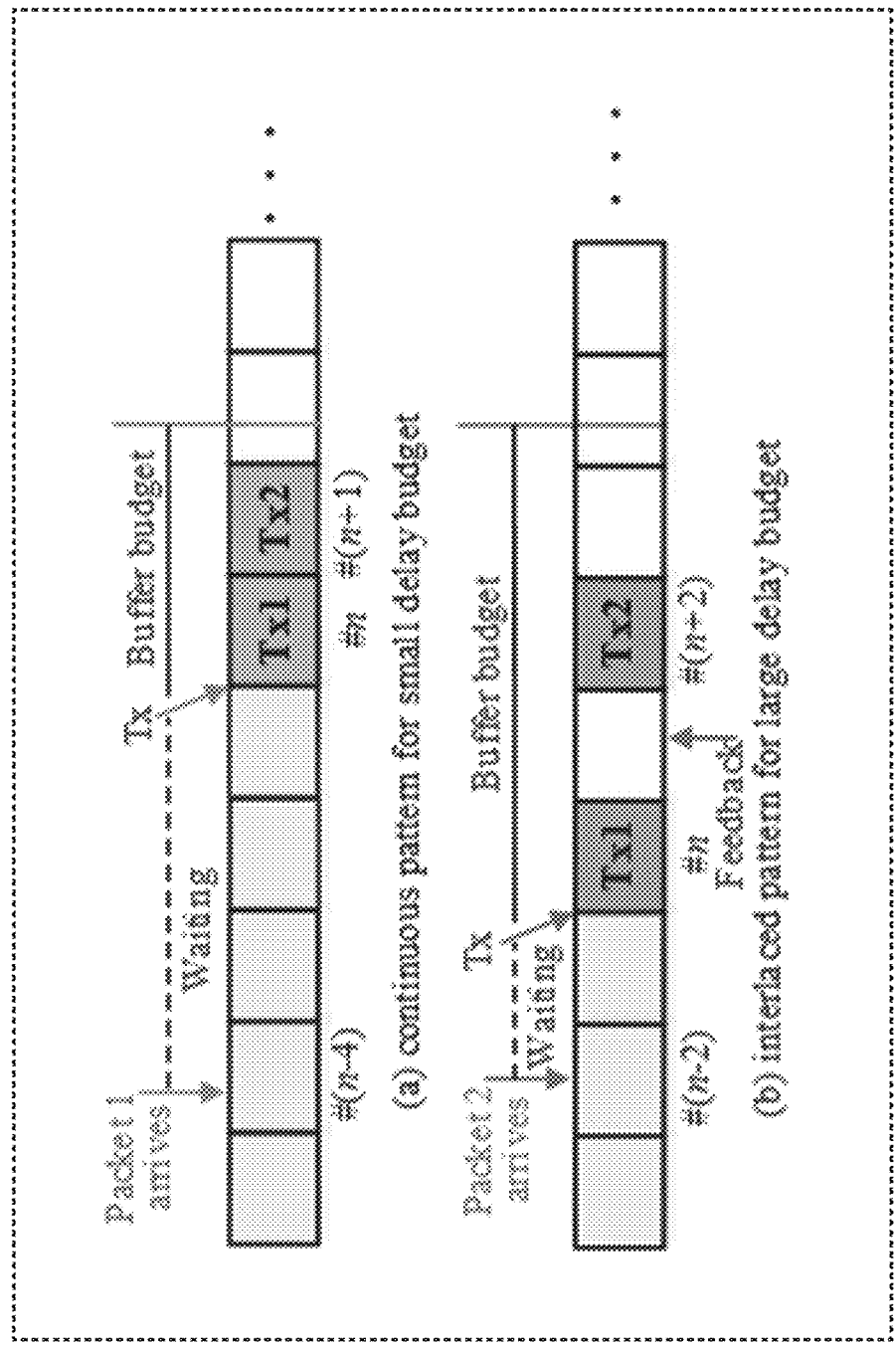
FIG. 1 is a diagram showing an example of a repetition transmission.
Figure 2:
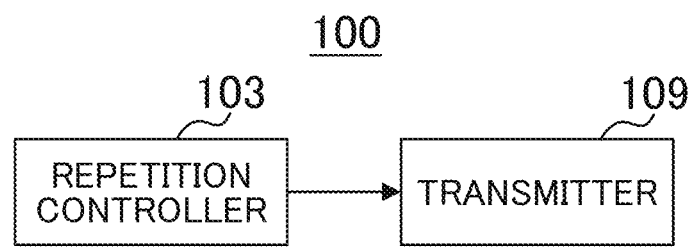
FIG. 2 is a block diagram showing a configuration of a part of a base station when a downlink data channel is used.

FIG. 2 is a block diagram showing a configuration of a portion of base station 100 (i.e., a transmission apparatus) when a downlink data channel (PDSCH) is used according to the embodiment of the present disclosure. In base station 100 shown in FIG. 2, repetition controller 103 determines a repetition pattern of data for terminal 200 (a reception apparatus), and transmitter 109 transmits the data repeatedly based on the repetition pattern.

Figure 3:
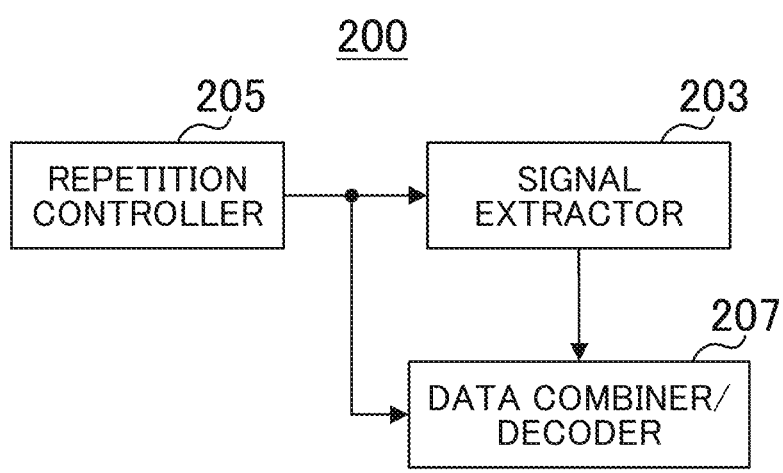
FIG. 3 is a block diagram showing a configuration of a part of a terminal when a downlink data channel is used.

FIG. 3 is a block diagram showing a configuration of a part of terminal 200 (i.e., a reception apparatus) when a downlink data channel (PDSCH) is used according to the embodiment of the present disclosure. In terminal 200 shown in FIG. 3, repetition controller 205 determines a repetition pattern of data for terminal 200, signal extractor 203 receives (extracts) the repeatedly transmitted data based on the repetition pattern, and data combiner/decoder 207 combines the data repeatedly transmitted.

In FIG. 2 and FIG. 3, the repetition pattern of data is associated with control information indicated to terminal 200 by dynamic signaling (DCI).

Figure 4:
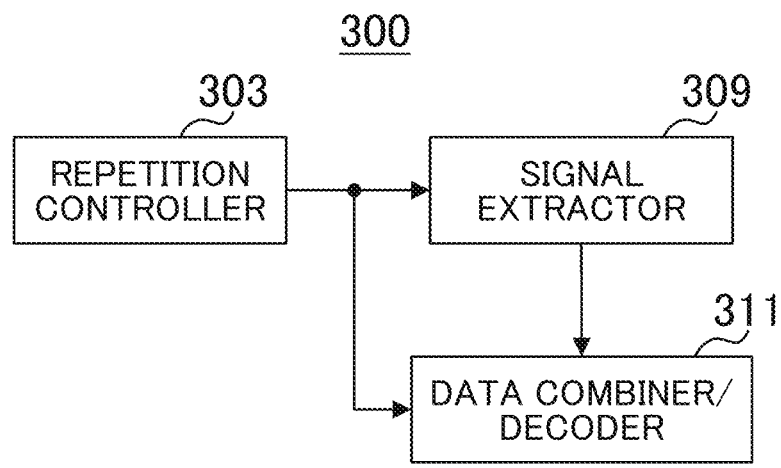
FIG. 4 is a block diagram showing a configuration of a part of a base station when an uplink data channel is used.

FIG. 4 is a block diagram showing a configuration of a part of base station 300 (i.e., a reception apparatus) when an uplink data channel (PUSCH) is used, according to the embodiment of the present disclosure. In base station 300 shown in FIG. 4, repetition controller 303 determines a repetition pattern of data for terminal 400 (transmission apparatus), signal extractor 309 receives (extracts) the repeatedly transmitted data based on the repetition pattern, and data combiner/decoder 311 combines the data repeatedly transmitted.

Figure 5:
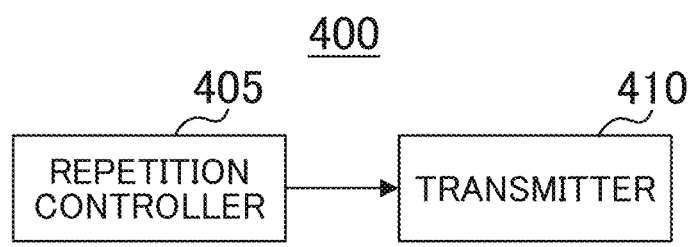
FIG. 5 is a block diagram showing a configuration of a part of a terminal when an uplink data channel is used.

FIG. 5 is a diagram showing a configuration of a part of terminal 400 (i.e., a transmission apparatus) when an uplink data channel (PUSCH) is used, according to the embodiment of the present disclosure. In terminal 400 shown in FIG. 5, repetition controller 405 determines a repetition pattern of data for terminal 400, and transmitter 410 transmits data repeatedly based on the repetition pattern.

In FIG. 4 and FIG. 5, the repetition pattern of data is associated with control information indicated to terminal 400 by dynamic signaling (DCI).

Configuration of Base Station 100

Figure 6:
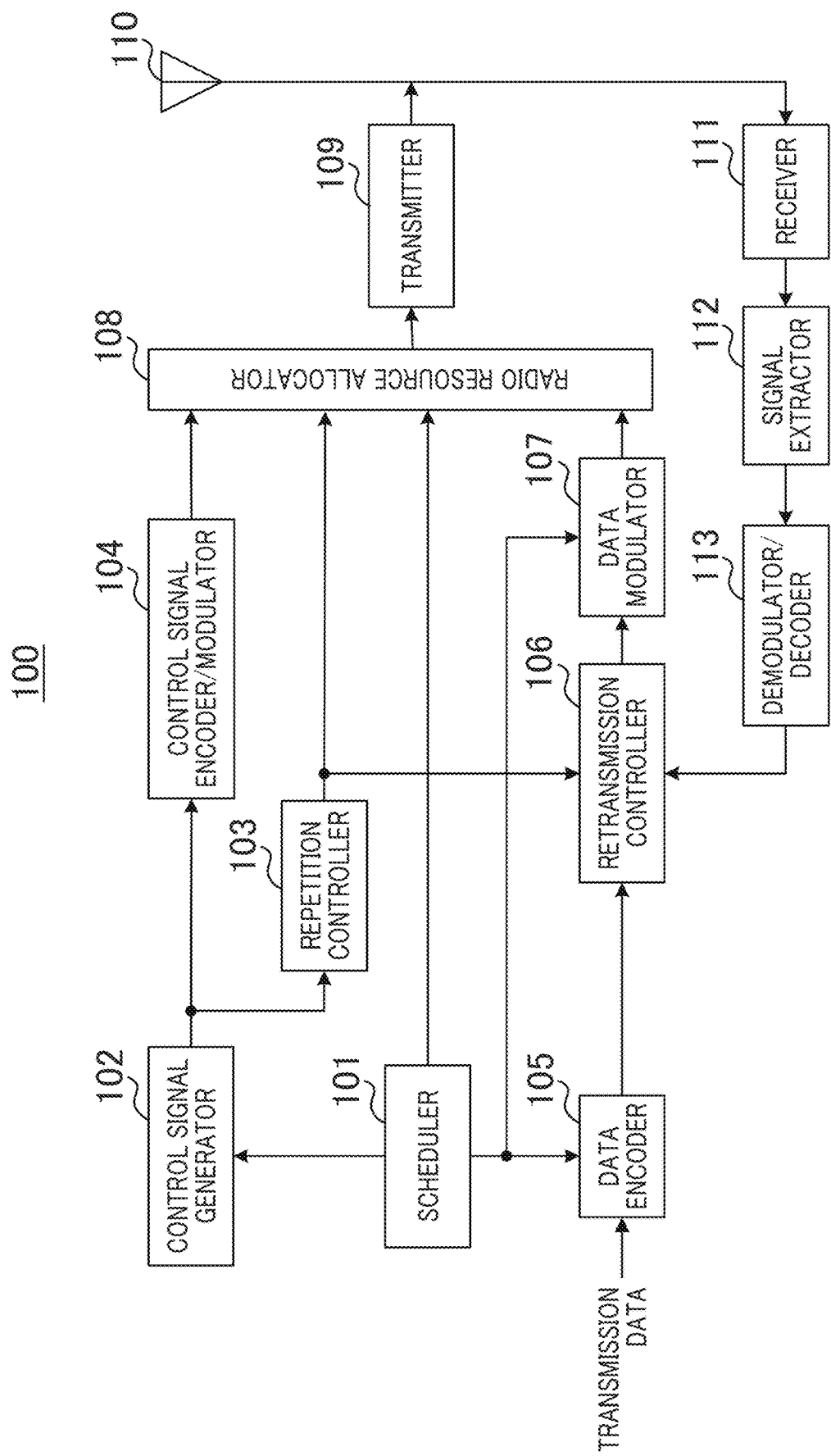
FIG. 6 is a block diagram showing a configuration of a base station when a downlink data channel is used.

FIG. 6 is a block diagram showing an exemplary configuration of base station 100 when a downlink data channel (PDSCH) is used, according to the present embodiment.

Base station 100 shown in FIG. 6 includes scheduler 101, control signal generator 102, repetition controller 103, control signal encoder/modulator 104, data encoder 105, retransmission controller 106, data modulator 107, radio resource allocator 108, transmitter 109, antenna 110, receiver 111, signal extractor 112, and demodulator/decoder 113.

Scheduler 101 determines a control signal (also referred to as PDCCH, NR-PDCCH, or DL assignment) for terminal 200 and radio resource allocation information (such as frequency resource allocation information, time resource allocation information, terminal ID, data demodulating reference signal information, and/or modulation/coding scheme) in a prescribed packet transmission time unit (such as TTI, slot, or mini-slot; hereinafter referred to as "Transmission Unit (TU)") of a downlink data channel (also referred to as PDSCH). Scheduler 101 outputs the determined radio resource allocation information to control signal generator 102, data encoder 105, and radio resource allocator 108.

Control signal generator 102 generates a control signal including control information (DCI) for scheduling terminal 200. The control information includes the radio resource allocation information of the downlink data channel (also referred to as PDSCH) to be inputted from scheduler 101. Control signal generator 102 generates a control signal using a control information bit sequence that is configured in a format having a prescribed size, and outputs the control signal to repetition controller 103 and control signal encoder/modulator 104.

Repetition controller 103 determines a repetition pattern of data signal radio resource allocation per TU for terminal 200 based on a prescribed rule, using the control information (DCI) included in the control signal to be inputted from control signal generator 102. Repetition controller 103 outputs the determined repetition pattern to radio resource allocator 108 and retransmission controller 106.

Here, the repetition pattern means a repetition pattern of radio resource allocation for each TU, and includes at least one of "a number of repetitions in a time domain (Number of TUs)," "a number of repetitions in a frequency domain," "transmission interval or non-transmission time (Number of TUs)," and "an RV order for each TU." The number of repetitions in a frequency domain means, for example, a number of times of repeating a frequency resource to be allocated, by adding a prescribed frequency offset (e.g., X [PRB: Physical Resource Block]). For example, in a case where the frequency resource allocation determined in scheduler 101 is PRB #n and the number of repetitions in a frequency domain determined in repetition controller 103 is equal to 2, base station 100 allocates data to be allocated to PRB #n, also to PRB #(X+n).

Details of a method of determining a repetition pattern of data signal radio resource allocation per TU in repetition controller 103 will be described later.

Control signal encoder/modulator 104 modulates and encodes a bit sequence to be inputted from control signal generator 102 and outputs a resulting symbol sequence to radio resource allocator 108.

Data encoder 105 performs error correction encoding on transmission data in accordance with an encoding method to be inputted from scheduler 101, and outputs the encoded data signal to retransmission controller 106.

At the time of a first (new) transmission, retransmission controller 106 holds the encoded data signal to be inputted from data encoder 105 and, at the same time, outputs the encoded data signal to data modulator 107. At the time of a retransmission, retransmission controller 106 controls the holding data based on an ACK/NACK result to be inputted from demodulator/decoder 113. Specifically, when receiving a NACK, retransmission controller 106 outputs corresponding holding data to data modulator 107. On the other hand, when receiving an ACK, retransmission controller 106 discards corresponding holding data and terminates transmission of downlink data.

Here, retransmission controller 106 outputs data of a Redundancy Version (RV: a pattern of a redundant bit for error correction) in accordance with a number of TUs to be transmitted, as encoded data to be outputted to data modulator 107 at the time of retransmission. For example, when using an RV pattern (RV order) whose RV is different for each number of TUs to be transmitted, the receiving side (here, terminal 200) can improve an encoding gain by combining data of a plurality of TUs and can improve reception quality. Further, when using an RV order whose RV is the same for each number of TUs to be transmitted, transmission processing can be simplified, so that delay time required for data transmission can be shortened. In addition, the RV order to be applied in each terminal 200 or each cell may be determined by base station 100 and indicated to terminal 200 by higher layer indication or the like to ensure consistent awareness between base station 100 and terminal 200 in advance.

Data modulator 107 modulates a data signal to be inputted from retransmission controller 106 using a prescribed modulation scheme inputted from scheduler 101, and outputs the modulated data signal to radio resource allocator 108.

Radio resource allocator 108 maps signals inputted as symbol sequences from control signal encoder/modulator 104 and data modulator 107, respectively, to radio resources instructed by scheduler 101 and repetition controller 103, and outputs the mapped signals to the transmitter 109. In detail, radio resource allocator 108 allocates a radio resource of a plurality of Tus for a data signal based on radio resource allocation information in TU (Transmission Unit) to be inputted from scheduler 101 and a repetition pattern of radio resource allocation between TUs to be inputted from repetition controller 103.

Transmitter 109 performs Radio Frequency (RF) processing such as Digital-to-Analog (D/A) conversion and up-conversion, on a signal to be inputted from radio resource allocator 108, and transmits a resultant radio signal to terminal 200 via antenna 110.

Receiver 111 performs RF processing such as down-conversion and A/D conversion on an uplink signal waveform transmitted from terminal 200 and received via antenna 110, and outputs a received signal after the RF processing to signal extractor 112.

Signal extractor 112 extracts a radio resource portion including a response signal to downlink data, from the received signal to be inputted from receiver 111, and outputs the extracted radio resource portion to demodulator/decoder 113.

Demodulator/decoder 113 performs equalization, demodulation, and error correction decoding on the response signal to be inputted from signal extractor 112, calculates ACK/NACK information of the downlink data included in the response signal, and outputs the ACK/NACK information to retransmission controller 106.

Configuration of Terminal 200

Figure 7:
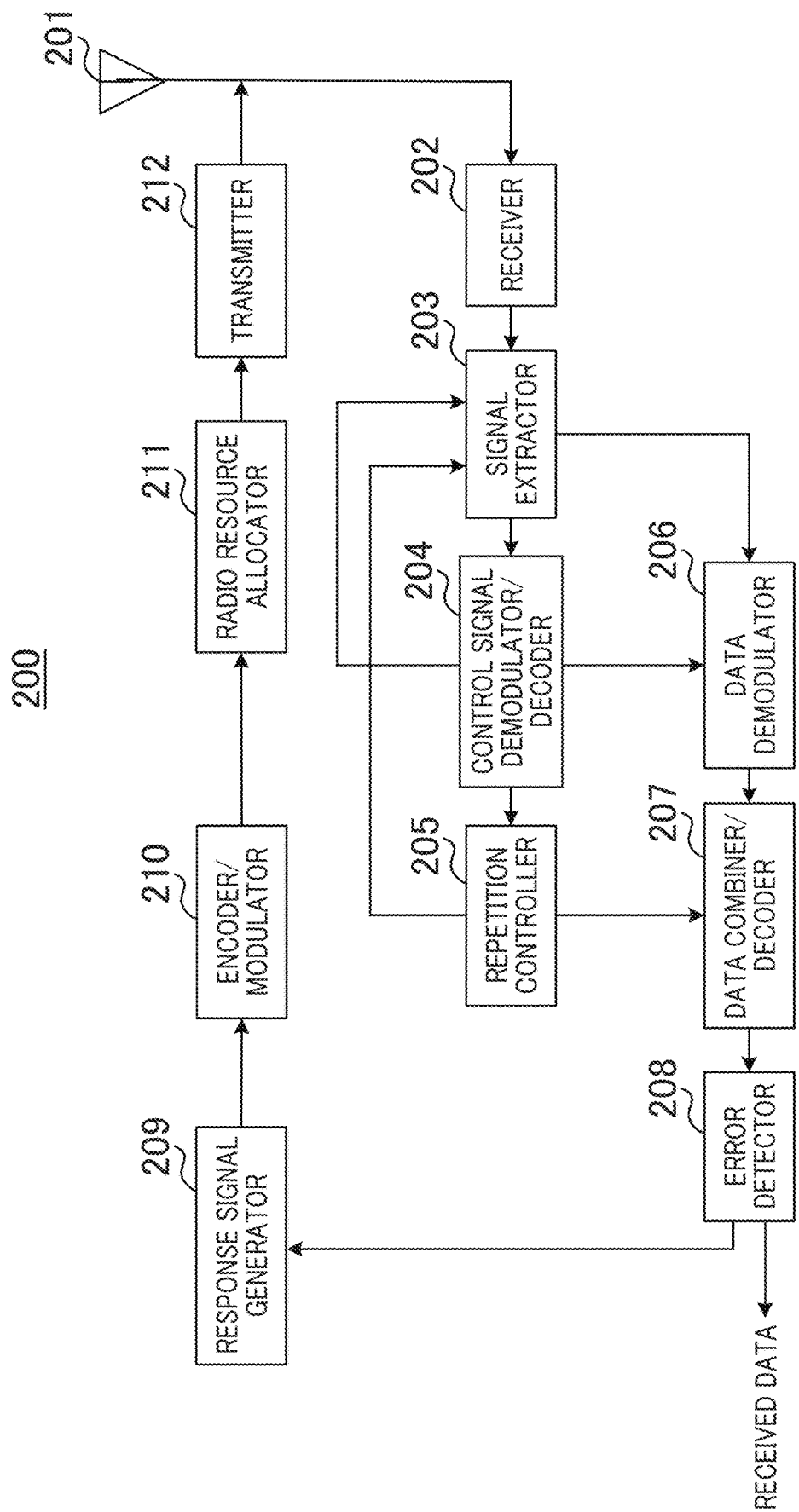
FIG. 7 is a block diagram showing a configuration of a terminal when a downlink data channel is used.

FIG. 7 is a block diagram showing an exemplary configuration of terminal 200 when a downlink data channel (PDSCH) is used, according to the present embodiment.

Terminal 200 shown in FIG. 7 includes antenna 201, receiver 202, signal extractor 203, control signal demodulator/decoder 204, repetition controller 205, data demodulator 206, data combiner/decoder 207, error detector 208, response signal generator 209, encoder/modulator 210, radio resource allocator 211, and transmitter 212.

Receiver 202 receives via antenna 201 a control signal and a data signal that are transmitted from base station 100, performs RF processing such as down-conversion and A/D conversion on a radio received signal, and outputs a baseband received signal after the RF processing to signal extractor 203.

Signal extractor 203 extracts a signal portion including a control signal, from the baseband received signal inputted from receiver 202, and outputs the extracted signal portion to control signal demodulator/decoder 204. Further, signal extractor 203 extracts a signal portion including a downlink data channel, from the baseband received signal, based on radio resource allocation information in TU to be inputted from control signal demodulator/decoder 204 and a repetition pattern of radio resource allocation between TUs to be inputted from repetition controller 205, and outputs the extracted signal portion to data demodulator 206.

Control signal demodulator/decoder 204 outputs, when perfoming blind decoding on the control signal to be inputted from signal extractor 203 and determines that the control signal is a control signal addressed to its terminal, control information (DCI) including radio resource allocation information in TU of the downlink data channel, to signal extractor 203, data demodulator 206, and repetition controller 205.

Repetition controller 205 performs processing similar to that of repetition controller 103 included in base station 100. That is, repetition controller 205 determines a repetition pattern of data signal radio resource allocation between TUs for terminal 200 based on a prescribed rule, using the control information (DCI) to be inputted from control signal demodulator/decoder 204. Repetition controller 205 outputs the determined repetition pattern to signal extractor 203 and data combiner/decoder 207.

Data demodulator 206 demodulates the downlink data channel to be inputted from signal extractor 203, based on the radio resource allocation information to be inputted from control signal demodulator/decoder 204, and outputs the downlink data channel after the demodulation to data combiner/decoder 207.

Data combiner/decoder 207 combines repeated data between a plurality of TUs with respect to data to be inputted from data demodulator 206, decodes the combined data, and outputs the decoded downlink data to error detector 208. Here, at the time of data synthesis, data combiner/decoder 207 enables obtaining a coding gain by performing the synthesis, considering an RV order (a pattern of RV for each TU) to be inputted from repetition controller 205. In a case of retransmission data, data combiner/decoder 207 can improve reception quality by performing the synthesis, including the data at the time of previous transmission.

Error detector 208 performs CRC-based error detection on the data to be inputted from data combiner/decoder 207, determines whether it is an ACK (no error) or a NACK (error exists), and outputs a determination result to response signal generator 209. Further, error detector 208 obtains the received data when there is no error in the data.

Response signal generator 209 generates a response signal (bit sequence) for the received downlink channel data based on an error detection result (ACK or NACK) to be inputted from error detector 208, and outputs the response signal (bit sequence) to encoder/modulator 210.

Encoder/modulator 210 performs error correction encoding and modulation on the bit sequence to be inputted from response signal generator 209, and outputs a symbol sequence to radio resource allocator 211.

Radio resource allocator 211 maps a signal inputted as the symbol sequence from encoder/modulator 210, to a prescribed radio resource, and outputs the mapped signal to transmitter 212.

Transmitter 212 performs RF processing such as D/A conversion and up-conversion on the signal to be inputted from radio resource allocator 211, and transmits a radio signal to base station 100 via antenna 201.

Configuration of Base Station 300

Figure 8:
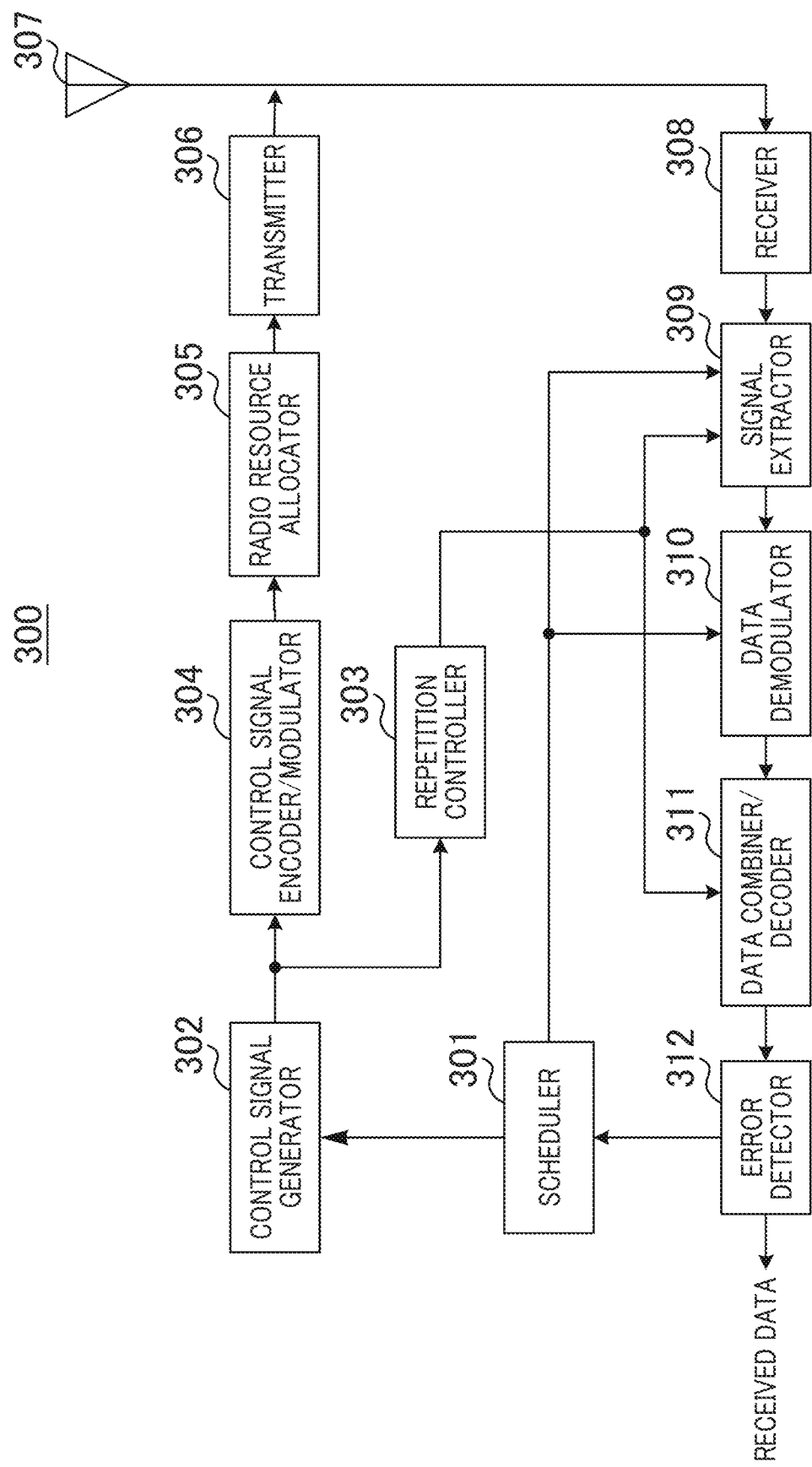
FIG. 8 is a block diagram showing a configuration of a base station when an uplink data channel is used.

FIG. 8 is a block diagram showing an exemplary configuration of base station 300 when an uplink data channel (PUSCH) is used, according to the present embodiment.

Base station 300 shown in FIG. 8 includes scheduler 301, control signal generator 302, repetition controller 303, control signal encoder/modulator 304, radio resource allocator 305, transmitter 306, antenna 307, receiver 308, signal extractor 309, data demodulator 310, data combiner/decoder 311, and error detector 312.

Scheduler 301, control signal generator 302, repetition controller 303, control signal encoder/modulator 304, transmitter 306, and receiver 308 perform operations similar to those of scheduler 101, control signal generator 102, repetition controller 103, control signal encoder/modulator 104, transmitter 109, and receiver 111 of base station 100 shown in FIG. 6.

That is, scheduler 301 determines radio resource allocation information for terminal 400 in a prescribed TU of a control signal and an uplink data channel (also referred to as PUSCH), and outputs the determined radio resource allocation information to control signal generator 302, signal extractor 309, and data demodulator 310. Further, scheduler 301 preferentially schedules retransmission data of the uplink data channel when a determination result of previous transmission data, which is inputted from error detector 312, is a NACK.

Control signal generator 302 uses the radio resource allocation information to be inputted from scheduler 301 to generate control information (DCI) using a control information bit sequence that is configured in a format having a prescribed size, and outputs the control information (DCI) to repetition controller 303 and control signal encoder/modulator 304.

Repetition controller 303 determines a repetition pattern of data signal radio resource allocation per TU for terminal 400 based on a prescribed rule, using the control information DCI to be inputted from control signal generator 302. Repetition controller 303 outputs the determined repetition pattern to signal extractor 309 and data combiner/decoder 311.

Control signal encoder/modulator 304 modulates and encodes a bit sequence to be inputted from control signal generator 302, and outputs a resulting symbol sequence to radio resource allocator 305.

Radio resource allocator 305 maps a signal inputted as a symbol sequence from control signal encoder/modulator 304, to a prescribed radio resource, and outputs the mapped signal to transmitter 306.

Transmitter 306 performs Radio Frequency (RF) processing such as Digital-to-Analog (D/A) conversion and up-conversion, on a signal to be inputted from radio resource allocator 305, and transmits a resultant radio signal to terminal 400 via antenna 307.

Receiver 308 performs RF processing such as down-conversion and A/D conversion on an uplink signal waveform transmitted from terminal 400 and received via antenna 307, and outputs a received signal after the RF processing to signal extractor 309.

Signal extractor 309, data demodulator 310, data combiner/decoder 311, and error detector 312 perform operations similar to those of signal extractor 203, data demodulator 206, data combiner/decoder 207, and error detector 208 of terminal 200 shown in FIG. 7.

That is, signal extractor 309 extracts a signal portion including an uplink data channel, from a baseband received signal, based on radio resource allocation information in TU to be inputted from scheduler 301 and a repetition pattern of radio resource allocation between TUs to be inputted from repetition controller 303, and outputs the extracted signal portion to data demodulator 310.

Data demodulator 310 demodulates the uplink data channel to be inputted from signal extractor 309, based on the radio resource allocation information to be inputted from scheduler 301, and outputs the uplink data channel after the demodulation to data combiner/decoder 311.

Data combiner/decoder 311 combines repeated data between a plurality of TUs with respect to data to be inputted from data demodulator 310, decodes the combined data, and outputs the decoded downlink data to error detector 312.

Here, at the time of synthesis, data combiner/decoder 311 can obtain a coding gain by performing the synthesis, considering an RV order (a pattern of RV for each TU) to be inputted from repetition controller 303. In a case of retransmission data, data combiner/decoder 311 can improve reception quality by performing the synthesis, including the data at the time of previous transmission.

Error detector 312 performs CRC-based error detection on the data to be inputted from data combiner/decoder 311, determines whether it is an ACK or a NACK, and outputs a determination result to scheduler 301. Further, error detector 312 obtains the received data when there is no error.

Configuration of Terminal 400

Figure 9:
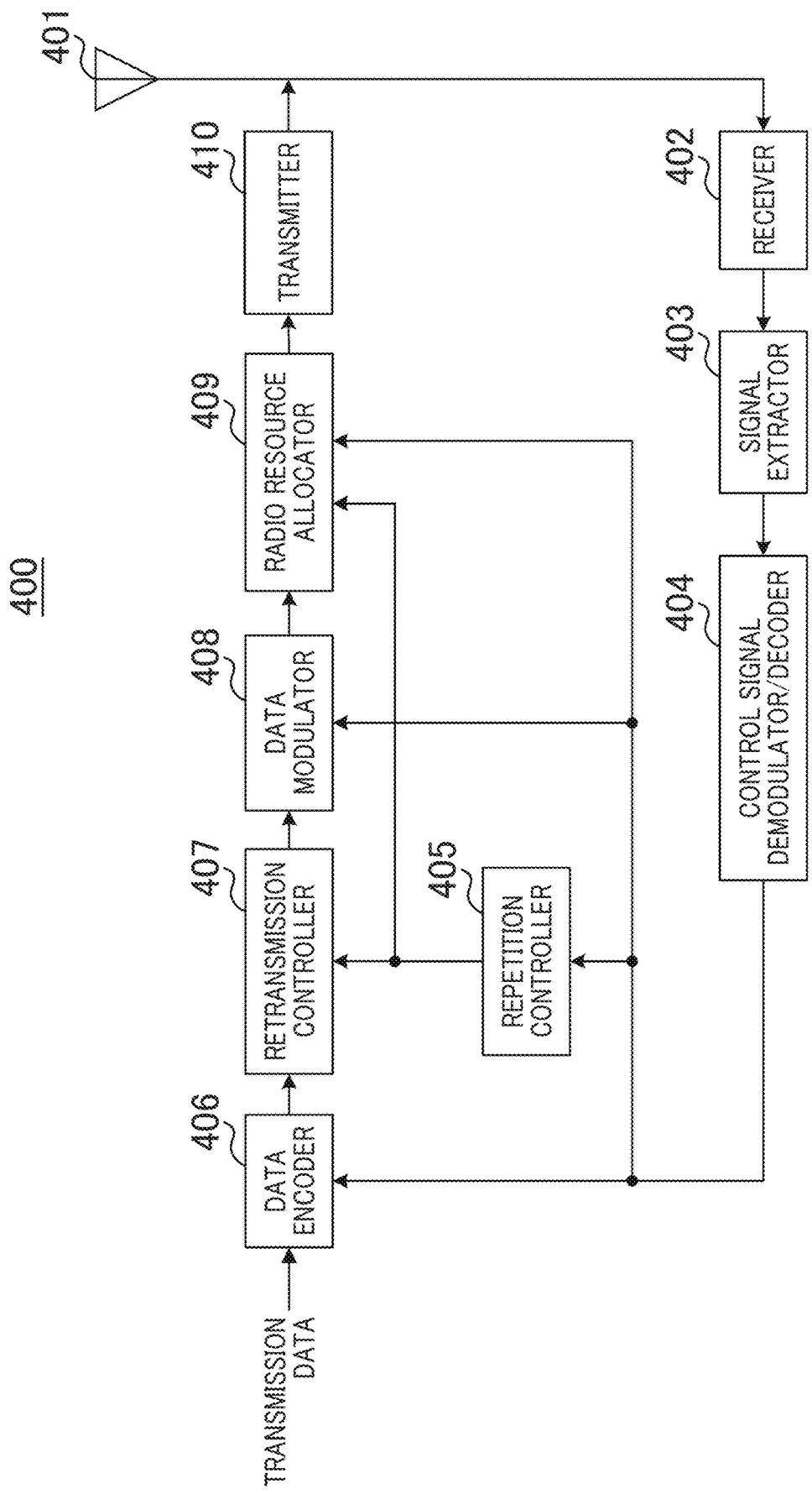
FIG. 9 is a block diagram showing a configuration of a terminal when an uplink data channel is used.

FIG. 9 is a block diagram showing an exemplary configuration of terminal 400 when an uplink data channel (PUSCH) is used, according to the present embodiment.

Terminal 400 shown in FIG. 9 includes antenna 401, receiver 402, signal extractor 403, control signal demodulator/decoder 404, repetition controller 405, data encoder 406, retransmission controller 407, data modulator 408, radio resource allocator 409, and transmitter 410.

Receiver 402, signal extractor 403, control signal demodulator/decoder 404, and repetition controller 405 perform operations similar to those of receiver 202, signal extractor 203, control signal demodulator/decoder 204, and repetition controller 205 of terminal 200 shown in FIG. 7.

That is, receiver 402 receives via antenna 401 a control signal and a data signal that are transmitted from base station 300, performs RF processing such as down-converting and A/D conversion on a radio received signal, and outputs a baseband received signal after the RF processing to signal extractor 403.

Signal extractor 403 extracts a signal portion including a control signal, from the baseband received signal inputted from receiver 402, and outputs the extracted signal portion to control signal demodulator/decoder 404.

Control signal demodulator/decoder 404 outputs, when performing blind decoding on the control signal to be inputted from signal extractor 403 and determines that the control signal is a control signal addressed to its terminal, control information (DCI) including radio resource allocation information in TU of the uplink data channel, to data encoder 406, data modulator 408, repetition controller 405, and radio resource allocator 409.

Repetition controller 405 determines a repetition pattern of data signal radio resource allocation between TUs for terminal 400 based on a prescribed rule, using the control information (DCI) to be inputted from control signal demodulator/decoder 404. Repetition controller 405 outputs the determined repetition pattern to retransmission controller 407 and radio resource allocator 409.

Data encoder 406, retransmission controller 407, data modulator 408, radio resource allocator 409, and transmitter 410 perform operations similar to those of data encoder 105, retransmission controller 106, data modulator 107, radio resource allocator 108, and transmitter 109 of base station 100 shown in FIG. 6.

That is, data encoder 406 performs error correction encoding on transmission data in accordance with an encoding method included in the control information (DCI) to be inputted from control signal demodulator/decoder 404, and outputs the encoded data signal to retransmission controller 407.

At the time of a first (new) transmission, retransmission controller 407 holds the encoded data signal to be inputted from data encoder 406 and, at the same time, outputs the encoded data signal to data modulator 408. At the time of retransmission, retransmission controller 407 outputs the holding data at the time of the first transmission, to data modulator 408. Here, retransmission controller 407 outputs RV data in accordance with a number of TUs to be transmitted, as encoded data to be outputted to data modulator 408 at the time of retransmission.

Data modulator 408 modulates a data signal to be inputted from retransmission controller 407 in a prescribed modulation method instructed by the control information (DCI) from control signal demodulator/decoder 404, and outputs the modulated data signal to radio resource allocator 409.

Radio resource allocator 409 allocates a signal inputted as a symbol sequence from data modulator 408, to radio resources of a plurality of TUs, based on radio resource allocation information in TU instructed by the control information DCI from control signal demodulator/decoder 404 and a repetition pattern of radio resource allocation between TUs instructed by repetition controller 405. Radio resource allocator 409 outputs the signal mapped to the radio resource, to transmitter 410.

Transmitter 410 performs Radio Frequency (RF) processing such as Digital-to-Analog (D/A) conversion and up-conversion, on a signal to be inputted from radio resource allocator 409, and transmits a resultant radio signal to base station 300 via antenna 401.

Operations of Base Station and Terminal

Operations of base stations 100, 300 and terminals 200, 400 having the above configurations will be described in detail.

Figure 10:
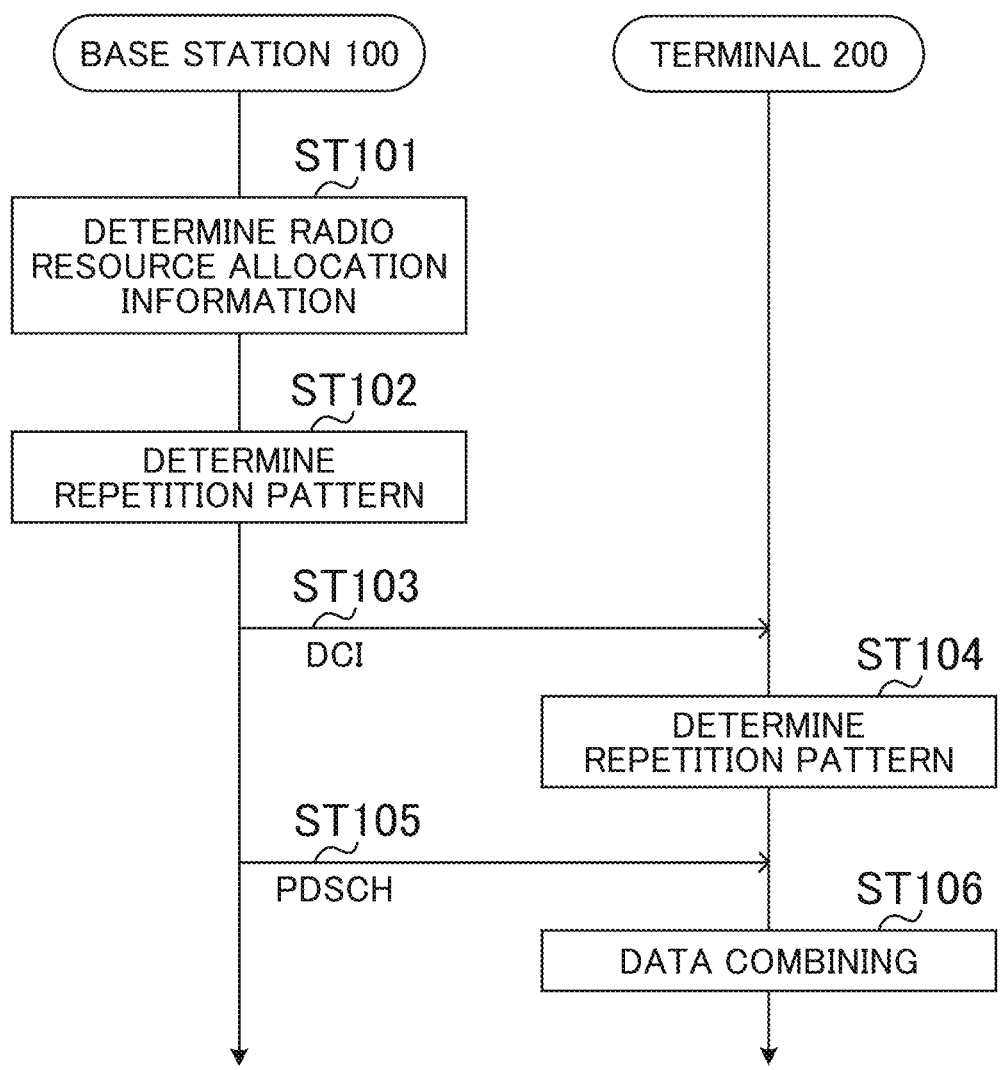
FIG. 10 is a sequence diagram showing an example of operations of a base station and a terminal when a downlink data channel is used.

FIG. 10 is a sequence diagram showing operations (operations when a downlink data channel is used) of base station 100 (FIG. 6) and terminal 200 (FIG. 7).

Base station 100 determines radio resource allocation information on a downlink resource for terminal 200 and generates a DCI (ST101). Then, base station 100 determines a repetition pattern of data (downlink data channel) for terminal 200 (i.e., a repetition pattern of data signal radio resource allocation between TUs) based on the radio resource allocation information included in the DCI generated in ST101 (ST102).

Next, base station 100 transmits PDCCH including the DCI generated in ST101 to terminal 200 (ST103). Upon receiving the PDCCH, terminal 200 determines a repetition pattern of data for terminal 200 (i.e., a repetition pattern of data signal radio resource allocation between TUs), based on the radio resource allocation information indicated by the DCI included in the PDCCH, in a way similar to that in ST102 (ST104).

Then, base station 100 repeatedly transmits data (PDSCH) based on the radio resource allocation information determined in ST101 and the repetition pattern determined in ST102 (ST105). When terminal 200 receives the data (PDSCH), in ST105, based on the radio resource allocation information obtained in ST103 and the repetition pattern determined in ST104, terminal 200 combines the repeatedly transmitted data and decodes the data (ST106).

Figure 11:
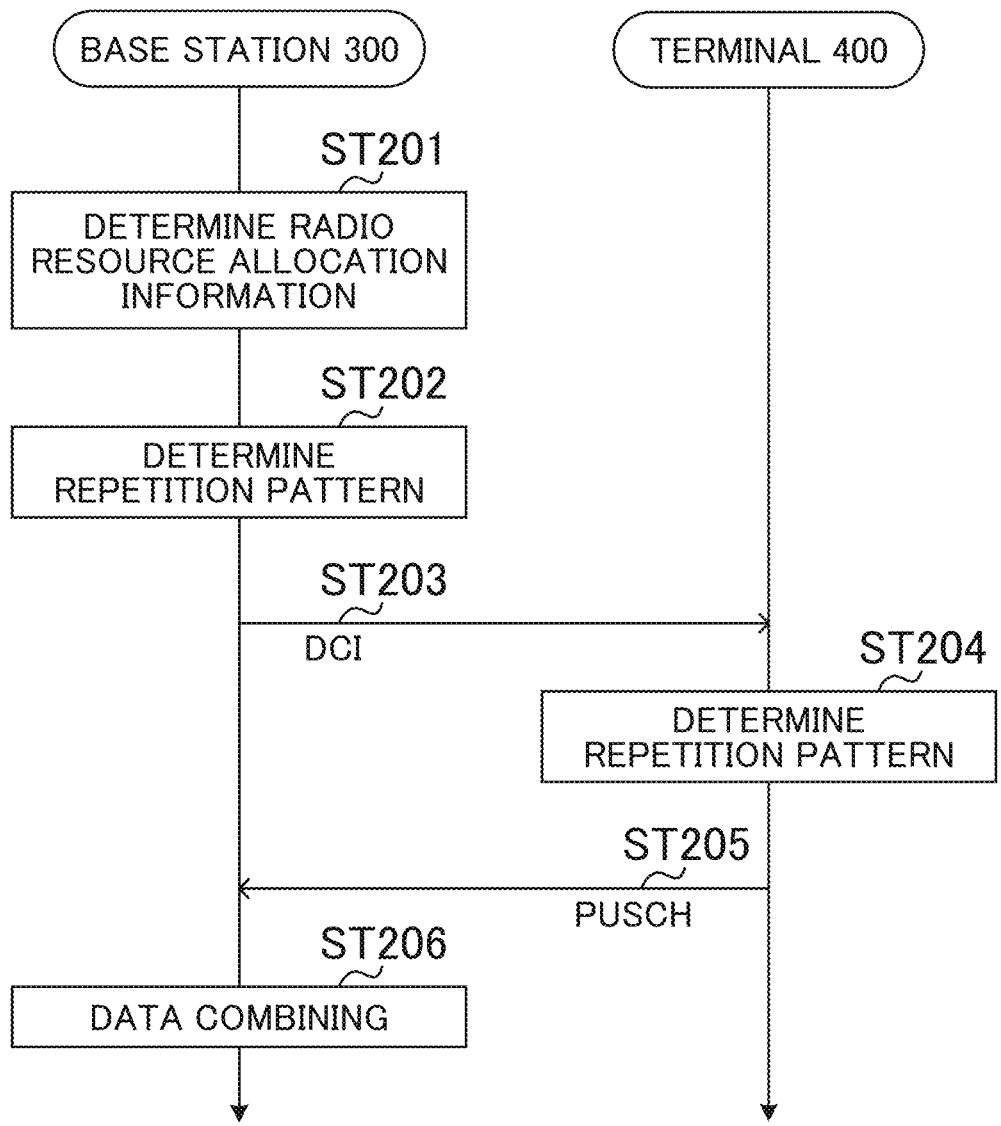
FIG. 11 is a sequence diagram showing an example of operations of a base station and a terminal when an uplink data channel is used.

FIG. 11 is a sequence diagram showing operations (operations when an uplink data channel is used) of base station 300 (FIG. 8) and terminal 400 (FIG. 9).

Base station 300 determines radio resource allocation information on an uplink resource for terminal 400 and generates a DCI (ST201). Then, base station 300 determines a repetition pattern of data (uplink data channel) for terminal 400 (i.e., a repetition pattern of data signal radio resource allocation between TUs) based on the radio resource allocation information included in the DCI generated in ST201 (ST202).

Next, base station 300 transmits PDCCH including the DCI generated in ST201 to terminal 400 (ST203). Upon receiving the PDCCH, terminal 400 determines a repetition pattern of data for terminal 400 (i.e., a repetition pattern of data signal radio resource allocation between TUs), based on the radio resource allocation information indicated by the DCI included in the PDCCH, in a way similar to that in ST202 (ST204).

Then, terminal 400 repeatedly transmits data (PUSCH) based on the radio resource allocation information obtained in ST203 and the repetition pattern determined in ST204 (ST205). When base station 300 receives the data (PUSCH), in ST205, based on the radio resource allocation information determined in ST201 and the repetition pattern determined in ST202, base station 300 combines the repeatedly transmitted data and decodes the data (ST206).

As described above, the repetition pattern is indicated in association with the control information (radio resource allocation information) that is indicated to terminal 200, 400 by the DCI.

Repetition Control Method

Next, a method of determining a repetition pattern of data signal radio resource allocation between TUs by repetition controllers 103, 205, 303, and 405 in base stations 100, 300 and terminals 200, 400 will be described in more detail.

Control Information Indicated by DCI

In the following description, as an example, base stations 100, 300 and terminals 200, 400 determine a repetition pattern of data signal radio resource allocation between TUs, based on control information to be explicitly or implicitly indicated by the DCI described below.
(1) Frequency allocation bandwidth per TU
(2) Number of symbols to be transmitted per TU
(3) Subcarrier spacing (SCS)
(4) Uplink channel type (either Supplementary Uplink (SUL) or Non-SUL)

In the NR, the frequency allocation bandwidth per TU (in detail, Frequency domain resource assignment), the number of symbols to be transmitted per TU (in detail, Time domain resource assignment), and the uplink channel type (in detail, UL/SUL indicator) are parameters that are explicitly indicated by DCI (see, for example, Non-Patent Literature 3).

On the other hand, the subcarrier spacing (SCS) is a parameter that is set from BWP allocation information (Bandwidth part indicator) included in DCI. The SCS used for data is configured in advance for each BWP. Therefore, terminals 200, 400 can implicitly know SCS to use, based on BWP instructed by DCI. That is, it can be said that the SCS is a parameter that is implicitly indicated by DCI.

As described above, the frequency allocation bandwidth per TU, the number of symbols to be transmitted per TU, the SCS, and the uplink channel type are parameters that are explicitly or implicitly indicated to terminals 200, 400 by DCI. That is, terminals 200, 400 can dynamically change the repetition pattern associated with these parameters, by receiving the DCI.

Repetition Pattern

In the following description, as an example, the repetition pattern determined by repetition controllers 103, 205, 303, 405 includes any of the following information.

(1) Number of repetitions of a time resource (2) Number of repetitions of a frequency resource (including a prescribed frequency interval and a number of repetitions)

(3) Transmission time interval or non-transmission section (4) RV order (RV pattern for each TU to be transmitted)

Here, the number of repetitions of a time resource, and the transmission time interval or non-transmission section will be described with reference to FIGS. 12A and 12B.

Figure 12A:
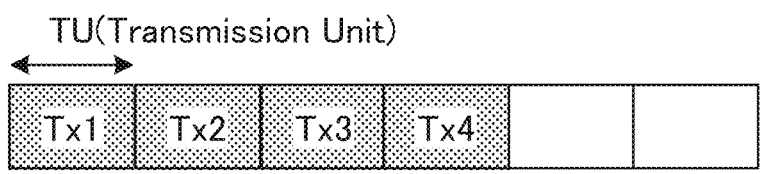
FIG. 12A is a diagram showing an example of the number of repetitions and a transmission time interval (non-transmission section) of a time resource.
Figure 12B:
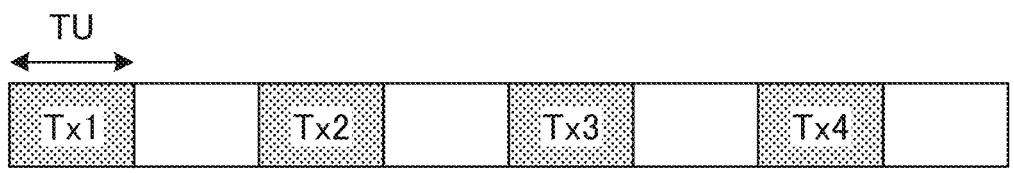
FIG. 12B is a diagram showing another example of the number of repetitions and the transmission time interval (non-transmission section) of the time resource.

As shown in FIGS. 12A and 12B, the number of repetitions of a time resource indicates a number of repetitions in units of TU. Also, the transmission time interval or non-transmission section similarly indicates time in units of TU. FIG. 12A shows an example in which the number of repetitions of a time resource is equal to 4 [TU] and the transmission time interval is equal to 0 [TU]. FIG. 12B shows an example in which the number of repetitions of a time resource is equal to 4 [TU] and the transmission time interval is equal to 1 [TU]. There are non-transmission sections in FIG. 12B, whereas there is no non-transmission section in FIG. 12A, so that FIG. 12A can reduce delay compared to FIG. 12B. On the other hand, in FIG. 12B, it is possible to allocate, by obtaining feedback information from the receiving side in the non-transmission sections, a radio resource to the subsequent data transmission efficiently.

Next, the number of repetitions of a frequency resource will be described with reference to FIG. 13.

Figure 13:
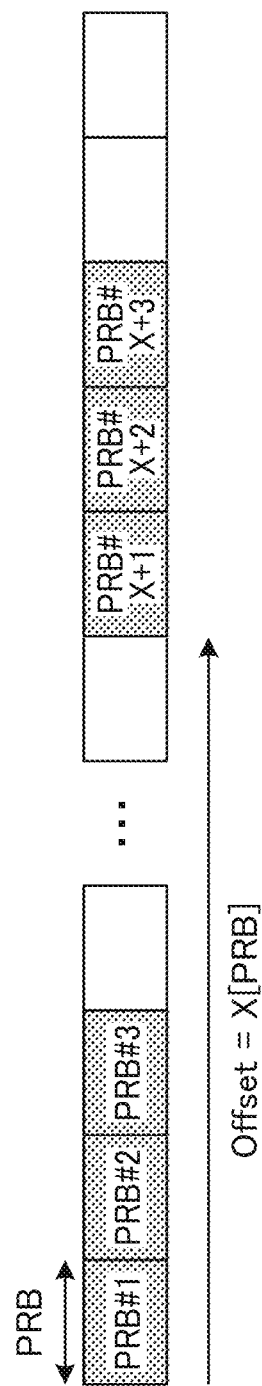
FIG. 13 is a diagram showing an example of the number of repetitions of a frequency resource.

In FIG. 13, when frequency allocation bands per TU allocated by DCI are represented as PRB #1 to PRB #3, data allocation is repeated in the frequency resource PRB #(X+1) to PRB #(X+3) obtained by adding a prescribed frequency offset (X[PRB] in FIG. 13). In a case where the number of repetitions in a frequency domain increases, data allocation is further repeated in the frequency resource PRB #(2X+1) to PRB #(2X+3) with the frequency offset added. The receiving side can obtain a frequency diversity gain by combining the data in the bands thus repeatedly allocated.

Next, the RV order will be described.

The RV order indicates an RV pattern that applies to the transmission order of the prescribed number of TUs. For example, when there are 0 to 3 RV patterns and a RV order up to the number of TUs to be transmitted=4 is to be defined, it is defined such that {Tx1, Tx2, Tx3, Tx4}={0, 0, 0, 0}, {0, 2, 3, 1}. When the RV order of {0, 0, 0, 0} is used, the same redundant bits are transmitted regardless of the number of times of transmission, so that the transmission/reception processing can be simplified and delay can be reduced, but a coding gain after synthesis will be low. On the other hand, when the RV order of {0, 2, 3, 1} is used, redundant bits that are different depending on the number of times of transmission are respectively transmitted, so that a coding gain after synthesis can be improved, but there is a possibility that delay increases because the transmission/reception processing will be complicated.

Note that the RV order is not limited to {0, 0, 0, 0}, {0, 2, 3, 1}, other patterns may be used.

Method of Determining Repetition Pattern

Next, a specific example of a method of determining a repetition pattern will be described.

Example 1: Based on Frequency Allocation Bandwidth

In Example 1, a repetition pattern is determined in accordance with a frequency allocation bandwidth per TU.

If packet size (Payload size) is the same, it is assumed that the narrower the frequency allocation bandwidth is, the higher the coding rate becomes and the lower the reception quality becomes. Therefore, in Example 1, as the frequency allocation bandwidth is narrower, the number of repetitions of a time resource (or a frequency resource) is increased.

For example, as shown in FIG. 14, when the frequency allocation bandwidth per TU (number of PRBs) is larger than a prescribed bandwidth (X [PRB]), the number of repetitions is set to 2. On the other hand, when the frequency allocation bandwidth per TU is equal to or less than the prescribed bandwidth (X [PRB]), the number of repetitions is set to 4. That is, when the frequency allocation bandwidth per TU is equal to or less than the prescribed bandwidth X, the number of repetitions (4) that is larger than the number of repetitions (2) when the frequency allocation bandwidth per TU than the prescribed bandwidth (X) is configured in order to improve reception quality by a repetition-based combined gain, Thus, repetition controller 103, 205, 303, 405 can configure the repetition pattern dynamically in accordance with the frequency allocation bandwidth to be configured in terminal 200, 400, thereby making it possible to prevent deterioration of reception quality.

Further, the repetition pattern is uniquely derived based on the frequency allocation bandwidth included in a DCI. That is, the repetition pattern is implicitly indicated to terminals 200, 400 by the indication of the frequency allocation bandwidth. This eliminates the need for explicit indication for a repetition pattern, thereby preventing an increase in DCI size.

In addition, the correspondence relationship between the frequency allocation bandwidth and the repetition pattern (number of repetitions) shown in FIG. 14 is an example, and is not limited thereto. For example, a prescribed threshold value (X in FIG. 14) is not limited to one value, and a plurality of threshold values may be set. The number of repetitions may be set to a larger value as the frequency allocation bandwidth is narrower. Further, the number of repetitions is not limited to 2 or 4, and may be another value.

Example 2: Based on Number of Symbols to be Transmitted

In Example 2, the repetition pattern is determined in accordance with the number of symbols to be transmitted per TU.

Similar to Example 1, if packet size (Payload size) is the same, it is assumed that the smaller the number of symbols to be transmitted is, the higher the encoding rate becomes and the lower the reception quality becomes. Therefore, in Example 2, as the number of symbols to be transmitted is smaller, the number of repetitions of a time resource (or a frequency resource) is increased.

For example, as shown in FIG. 15, when the number of symbols to be transmitted per TU is larger than a prescribed number of symbols (X [symbol]), the number of repetitions is set to 2. On the other hand, if the number of symbols to be transmitted per TU is equal to or less than the prescribed number of symbols (X [symbol]), the number of repetitions is set to 4. That is, when the number of symbols to be transmitted per TU is equal to or less than the prescribed number of symbols X, the number of repetitions (4) that is larger than the number of repetitions (2) when the number of symbols to be transmitted per TU is larger than the prescribed number of symbols is set in order to improve reception quality by a repetition-based combined gain.

Thus, repetition controllers 103, 205, 303, 405 can configure the repetition pattern dynamically in accordance with the number of symbols to be transmitted to be set in terminals 200, 400, thereby making it possible to prevent reception quality from deteriorating.

Further, the repetition pattern is uniquely derived based on the number of symbols to be transmitted included in a DCI. That is, the repetition pattern is implicitly indicated to terminal 200, 400 by indication of the number of symbols to be transmitted. This eliminates the need for explicit indication for a repetition pattern, thereby preventing an increase in DCI size.

In addition, the correspondence relationship between the number of symbols to be transmitted and the repetition pattern (number of repetitions) shown in FIG. 15 is an example, and is not limited hereto. For example, a prescribed threshold value (X in FIG. 15) is not limited to one value, and a plurality of threshold values may be set. The number of repetitions may be set to a larger value as the number of symbols to be transmitted is smaller. Further, the number of repetitions is not limited to 2 or 4, and may be another value.

Example 3: Based on Subcarrier Spacing (SCS)

In Example 3, the repetition pattern is determined in accordance with the SCS used for a data channel.

Figures 16, 17:
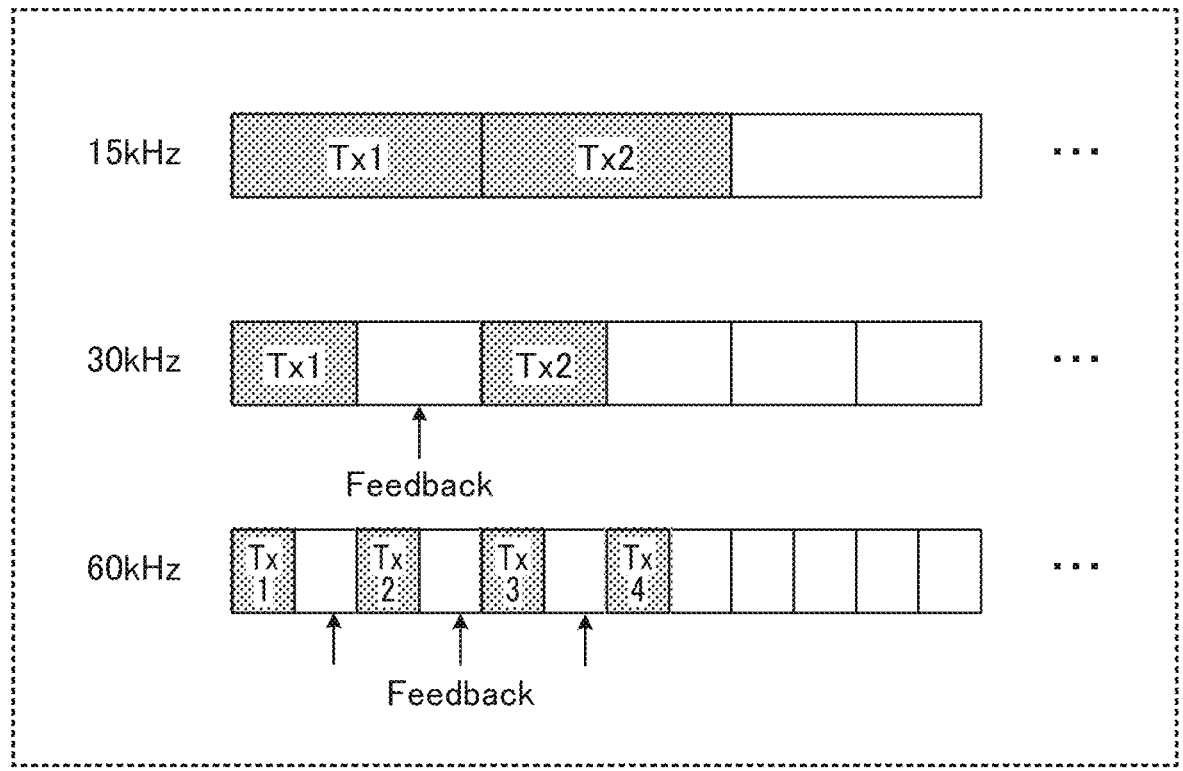
FIG. 16 is a diagram showing an example of a repetition pattern according to an SCS.
FIG. 17 is a diagram showing an example of a correspondence relationship between an SCS and a repetition pattern.

As shown in FIG. 16, the wider the SCS is, the shorter the length of 1 symbol becomes (i.e., the shorter the length of TU becomes). Therefore, as the SCS is wider, the number of repetitions or the transmission time interval can be increased without increasing delay time.

Therefore, in Example 3, the transmission interval in a case of SCS=30 kHz, 60 kHz is made longer than the transmission interval in a case of SCS=15 kHz, as shown in FIG. 17, for example. Specifically, the transmission interval in the case of SCS=30 kHz, 60 kHz is set to 1 [TU], and the transmission interval in the case of SCS=15 kHz is set to 0 [TU]. That is, in the case of SCS=15 kHz, data is transmitted in successive TUs and, in the case of SCS=30 kHz, 60 kHz, data is transmitted in non-continuous TUs spaced by non-transmission sections (1 TU), as shown in FIG. 16.

Therefore, the transmitting side can obtain feedback information from the receiving side in the non-transmission sections in the case of SCS=30 kHz, 60 kHz, thereby making it possible to perform the subsequent transmission efficiently.

Further, as shown in FIG. 17, the number of repetitions in the case of SCS=60 kHz may be larger than the number of repetitions in the case of SCS=15 kHz, 30 kHz. Specifically, the number of repetitions in the case of SCS=60 kHz is set to 4 [TU], and the number of repetitions in the case of SCS=15 kHz, 30 kHz is set to 2 [TU]. This results in a larger combined gain in the case of SCS=60 kHz.

In addition, as shown in FIG. 16, the larger the SCS is, the shorter the length of 1 symbol becomes, so that even if the transmission interval is increased or the number of repetitions is increased, delay time of data to be repeatedly transmitted will not increase.

Figures 18, 19:
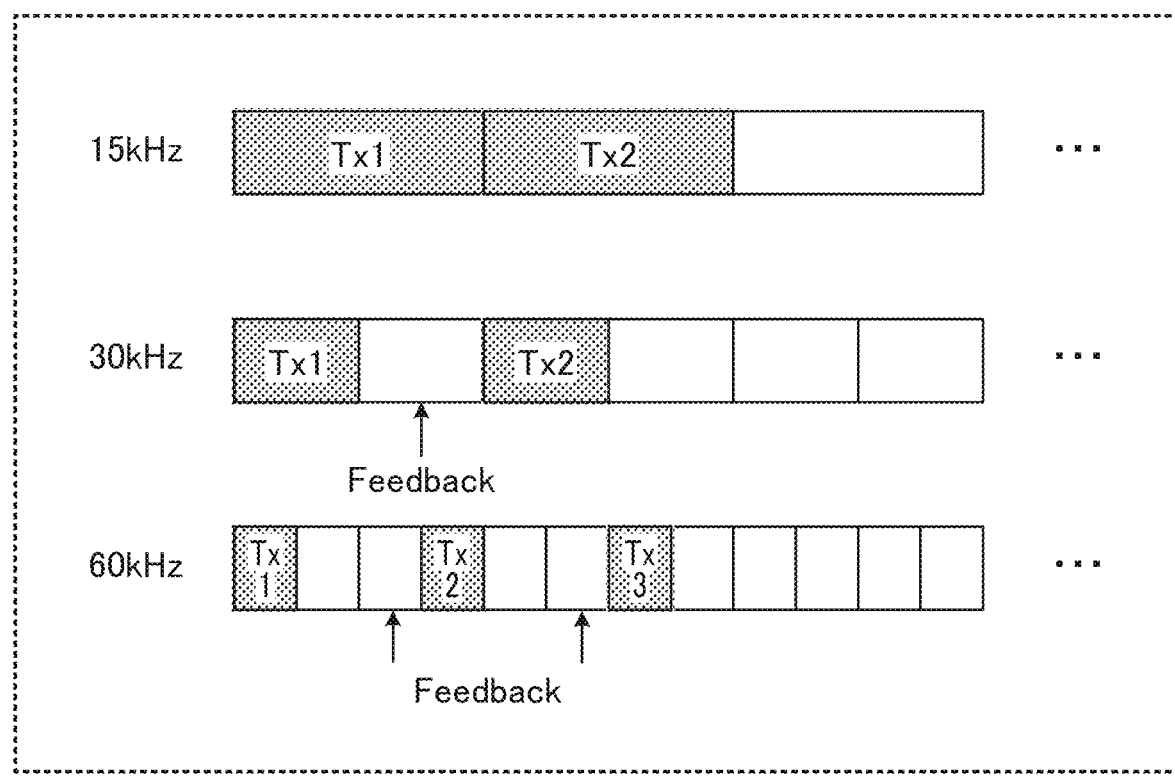
FIG. 18 is a diagram showing another example of the correspondence relationship between the SCS and the repetition pattern.
FIG. 19 is a diagram showing another example of the repetition pattern according to the SCS.

Further, as the SCS is wider, the transmission time interval (number of TUs) may be configured to be larger. For example, as shown in FIG. 18, it may be defined such that the wider the SCS is, the longer the transmission time interval becomes. As a result, as the SCS is wider (i.e., the length of 1 symbol is shorter), more non-transmission sections can be secured, as shown in FIG. 19, so that the transmitting side can receive reliably and process feedback information from the receiving side. That is, an appropriate timing for receiving the feedback information can be configured for each SCS.

As a result, repetition controllers 103, 205, 303, 405 can configure the repetition pattern dynamically in accordance with the SCS to be configured in terminals 200, 400, thereby making it possible to prevent reception quality from deteriorating.

Further, the repetition pattern is uniquely derived based on the SCS implicitly calculated from the BWP information included in the DCI. That is, the repetition pattern is implicitly indicated to terminals 200, 400 by the indication of the SCS based on the BWP information. This eliminates the need for explicit indication for a repetition pattern, thereby preventing an increase in DCI size.

Further, as another example, the RV order may be configured in accordance with the number of repetitions.

For example, as shown in FIG. 20, in a case of SCS=15 kHz, 30 kHz, the number of repetitions=2 TU is set, so that RV order={0, 3} to be used for transmitting the number of 2 TU is set. On the other hand, in a case of SCS=60 kHz, the number of repetitions=4 TU is set, so that RV order={0, 2, 3, 1} to be used for transmitting the number of 4 TU is set. That is, the number of RVs included in the RV order in each SCS is the same as the number of repetitions to be set for each SCS. As a result, it is possible to set the number of repetitions and the RV order in accordance with the SCS, and to prevent degradation of reception quality. Further, the number of repetitions and the RV order are uniquely derived based on the SCS implicitly indicated by the DCI as described above, so that it is possible to prevent an increase in DCI size.

Further, even when the number of repetitions is constant regardless of the SCS, the RV order may be configured in accordance with the SCS to be used for a data channel.

Figures 21, 22:
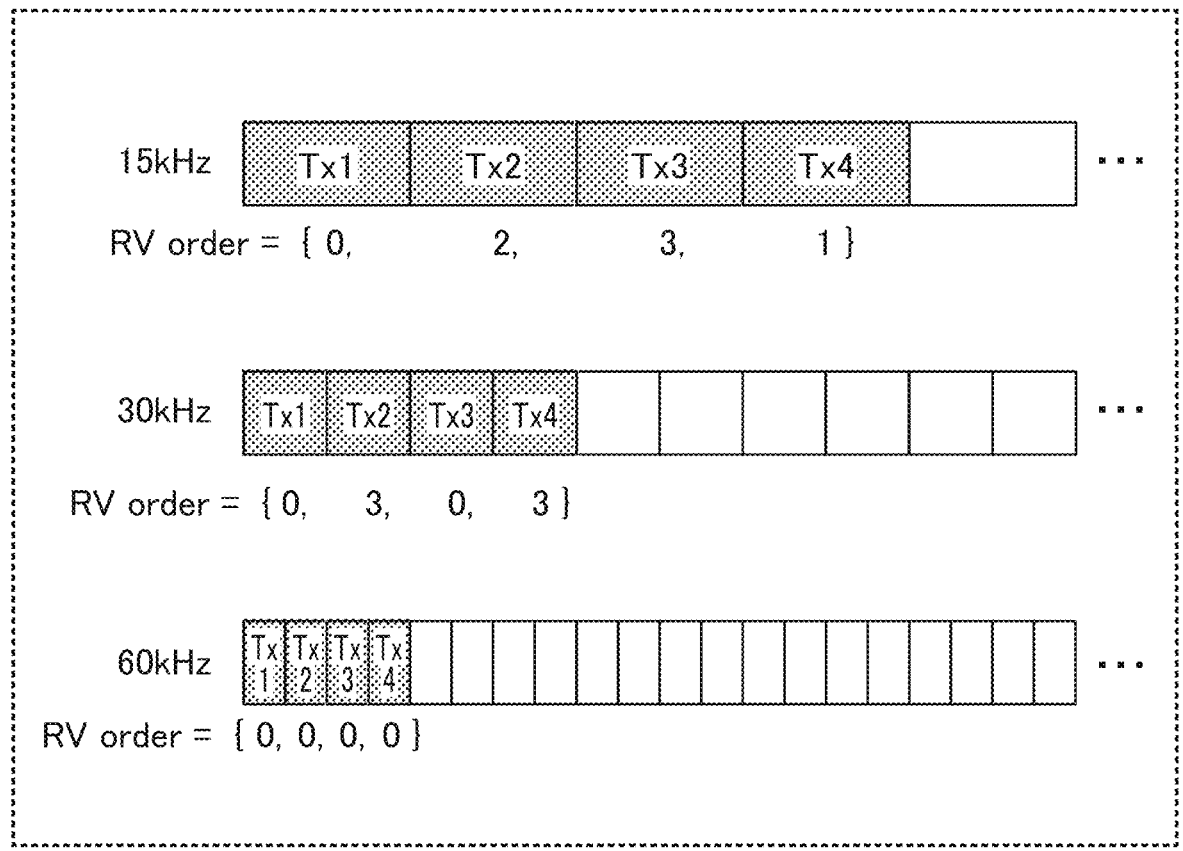
FIG. 21 is a diagram showing another example of the repetition pattern according to the SCS.
FIG. 22 is a diagram showing an example of a correspondence relationship between an SCS and an RV order.

For example, as shown in FIG. 21, the wider the SCS is, the shorter the length of 1 symbol is, so that processing time until the next transmission becomes shorter. Therefore, as the SCS is wider, the RV order having less change in an RV pattern is configured, as shown in FIG. 22, for example.

Specifically, in a case of SCS=15 KHz, time per TU is long and there is a margin in its processing time, so that RV order={0, 2, 3, 1} whose RV pattern is different for each TU is set. Thus, a coding gain can be obtained.

On the other hand, in a case of SCS=60 kHz, time per TU is short and there is no margin in its processing time, so that RV order={0, 0, 0, 0} whose RV pattern is the same for each TU (i.e., RV order whose RV pattern does not change) is set. This can prevent an increase in delay.

Further, in a case of SCS=30 kHz, time per TU is shorter compared to the case of SCS=15 kHz, so that RV order={0, 3, 0, 3} with less change in an RV pattern than the RV order in the case of SCS=15 kHz is set. In other words, in the case of SCS=30 kHz, the time per TU is long compared to the case of SCS=60 kHz, so that RV order={0, 3, 0, 3} with more change in the RV pattern than the RV order in the case of SCS=60 kHz is set.

As a result, an RV order in accordance with the SCS can be configured, thereby making it possible to prevent an increase in delay and deterioration of reception quality. Further, the RV order is uniquely derived based on the SCS implicitly calculated from the BWP information included in the DCI. That is, the RV order is implicitly indicated to terminals 200, 400 by the indication of the SCS. This eliminates the need for explicit indication for an RV order, thereby preventing an increase in DCI size.

In addition, the correspondence relationship between the SCS and the repetition pattern (number of repetitions, transmission interval, and RV order) shown in FIGS. 16 to 22 is an examples, and is not limited hereto. For example, the value of SCS is not limited to 15 kHz, 30 kHz, and 60 kHz, and may be other values (e.g., 120 kHz and 240 kHz). Further, the repetition pattern associated with the SCS may be at least one of the number of repetitions, the transmission time interval, and the RV order. Further, values of the number of repetitions, the transmission interval, and the RV order are not limited to the values shown in FIGS. 16 to 22, and may be other values. Further, in FIGS. 17 and 18, for example, the repetition pattern associated with the SCS may be one of the number of repetitions and the transmission time interval.

Example 4: Based on Uplink Channel Type

In Example 4, the repetition pattern is configured in accordance with the uplink channel type, in detail, whether the allocated uplink channel is an SUL or not.

In the NR, it is prescribed that a terminal supporting LTE and NR uses a frequency band of LTE supplementarily in an uplink transmission of the NR. The bandwidth allocated supplementarily in the uplink transmission of the NR is referred to as "Supplementary Uplink (SUL)."

It is assumed that SUL that uses a band for LTE has a lower carrier frequency compared to Non-SUL that uses a band for NR. The lower the carrier frequency is, the smaller the pass loss is, so that SUL can expect higher reception quality than Non-SUL.

Therefore, in Example 4, the number of repetitions is set to 2 when the uplink channel type assigned to terminals 200, 400 is SUL, and the number of repetitions is set to 4 when the uplink channel type assigned to terminals 200, 400 is non-SUL, as shown in FIG. 23, for example. That is, when the uplink channel type is non-SUL, the number of repetitions (4) that is larger than the number of repetitions (2) when the uplink channel type is SUL is set in order to improve reception quality by a repetition-based combined gain.

As a result, repetition controllers 103, 205, 303, 405 can configure the repetition pattern dynamically in accordance with the uplink channel type to be configured in terminals 200, 400, thereby making it possible to prevent reception quality from deteriorating.

Further, the repetition pattern is uniquely derived based on the uplink channel type included in a DCI. That is, the repetition pattern is implicitly indicated to terminals 200, 400 by the indication of the uplink channel type. This eliminates the need for explicit indication for a repetition pattern, thereby preventing an increase in DCI size.

In addition, the correspondence relationship between the uplink channel type and the repetition pattern (number of repetitions) shown in FIG. 23 is an example, and is not limited hereto. That is, the number of repetitions is not limited to 2 or 4, and may be another value.

Examples 1 to 4 have been described thus far, respectively.

As described above, in the present embodiment, the repetition pattern is associated with the control information that is explicitly or implicitly indicated to terminals 200, 400 by Dynamic Signaling (DCI). As a result, base stations 100, 300 can control the repetition patterns for terminals 200, 400 dynamically in accordance with the indication of the DCI. That is, terminals 200, 400 can change the repetition pattern for terminals 200, 400 dynamically by the indication of the DCI from base stations 100, 300.

Further, the repetition pattern is implicitly indicated to terminal 200, 400 by another parameter (e.g., radio resource allocation information) other than the repetition pattern. This eliminates the need for explicit signaling for the indication of the repetition pattern during the dynamic control of the repetition pattern.

As described above, according to the present embodiment, it is possible to dynamically change a repetition transmission method appropriately, thereby making it possible to improve the system performance.

The embodiments of the present disclosure have been described thus far.

(1) Note that the use of the present disclosure is not limited to URLLC. For example, one aspect of the present disclosure can be applied to a repetition transmission for the purpose of improving coverage performance in mMTC, and similar effects can be obtained.

(2) Further, in the above embodiment, the case of implicitly indicating the repetition pattern of the data signal radio resource allocation between TUs by the DCI has been described, but it is not limited to this. For example, DCI information to be used for instructing a repetition pattern may be added and combined with the examples in the above embodiment. For example, as shown in FIG. 24, one bit of information indicating a repetition pattern may be included in the DCI to determine the number of repetitions. Specifically, in FIG. 24, candidates (1, 4) or (2, 8) of the repetition pattern (number of repetitions) are determined in accordance with the frequency allocation bandwidth, similarly to Example 1 (FIG. 14), and the number of repetitions is determined in accordance with the information of one bit included in the DCI from among the determined candidates.

As a result, although the DCI size increases slightly (by one bit), it is possible to configure a more appropriate repetition pattern in accordance with the radio channel status of terminal 200.

Note that FIG. 24 is an example, and parameters for determining the repetition pattern in combination with the 1-bit DCI information are not limited to the frequency allocation bandwidth, and may be other parameters (the number of symbols to be transmitted, the SCS, the uplink channel type). Further, the repetition pattern is not limited to the number of repetitions, and may be other values (the transmission interval, the RV order).

(3) Further, when the candidates of the repetition pattern of data signal radio resource allocation between TUs is determined based on the parameter (control information) explicitly or implicitly indicated by DCI, a repetition pattern to be actually applied may be indicated by DCI information from among the candidates.

For example, as shown in FIG. 25, the candidate of the repetition pattern (the number of repetitions) is set to {1, 2, 4, 8} when the uplink channel type is SUL, and the candidate of the repetition pattern (the number of repetitions) is set to {1, 4, 16, 32} when the uplink channel type is Non-SUL. As described above, it is assumed that Non-SUL uses a higher carrier frequency than SUL, thereby allowing the number of repetitions larger than SUL to be set.

In the case of FIG. 25, base stations 100, 300 can dynamically select the optimum number of repetitions in accordance with the radio channel status of terminals 200, 400 from among the candidates, by adding two bits to the DCI, for the indication of the repetition pattern. As a result, although the DCI size increases slightly (by 2 bits), it is possible to configure an appropriate repetition pattern more in accordance with the radio channel status of terminals 200, 400.

Note that FIG. 25 is an example, and parameters associated with candidates of the repetition pattern are not limited to the uplink channel type, and may be other parameters (the frequency allocation bandwidth, the number of symbols to be transmitted, the SCS). Further, the repetition pattern is not limited to the number of repetitions, and may be other values (the transmission interval, the RV order).

(4) The relationship (FIGS. 14, 15, 17, 18, 20, and 22 to 25) between the control information explicitly or implicitly indicated by the DCI and the repetition pattern of data signal radio resource allocation between Tus, as described in the above embodiment, may be configured by base stations 100, 300 in a higher layer indication for each terminal 200, 400. Thus, it is possible to configure a repetition pattern suitable for each terminal 200, 400. Further, the relationship between the above parameter and the repetition pattern may be defined for each cell or by a specification. This can reduce the overhead of the higher layer indication.

(5) Further, the repetition patterns of data signal radio resource allocation between TUs may be determined in accordance with the type of data waveform to be used by terminals 200, 400. In a case where the data waveform is DFT-S-OFDM, there is an advantage that Peak to Average Power Ratio (PAPR) is low, but it has a feature that reception performance deteriorates compared to a case where the data waveform is OFDM. Therefore, it is possible to prevent deterioration of reception quality in the case of DFT-S-OFDM by setting the number of repetitions in the case of DFT-S-OFDM to be larger than the number of repetitions in the case of OFDM.

Further, the repetition pattern of data signal radio resource allocation between TUs may be determined in accordance with a Cyclic Prefix (CP) type to be used by terminals 200, and 400. It is assumed that the cell that uses Extended CP (ECP) has a larger cell radius compared to the cell that uses Normal CP (NCP). Therefore, it is possible to prevent deterioration of reception quality in a case where the CP type is ECP by setting the number of repetitions in the case where the CP type is ECP to be larger than the number of repetitions in the case where the CP type is NCP.

In addition, the type of data waveform or the CP type may be indicated by the DCI.

(6) The relationship between the control information (e.g., frequency allocation bandwidth per TU, number of symbols to be transmitted per TU, SCS, uplink channel type) explicitly or implicitly indicated by DCI and the repetition pattern (e.g., number of repetitions of a time resource, number of repetitions of a frequency resource, transmission time interval, RV order) of data signal radio resource allocation between TUs, as shown in FIGS. 14, 15, 17, 18, 20, and 22 to 25, is an example. Any of the correspondence relationships shown in FIGS. 14, 15, 17, 18, 20, and 22 to 25 may be combined.

(7) The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be implemented in apparatuses, devices, and systems of any kind, each being provided with a communication function, (collectively referred to as "communication apparatuses"). Non-limiting examples of the communication apparatuses include telephones (such as portable phones and smartphones), tablets, personal computers (PCs) (such as laptops, desktops, and notebooks), cameras (such as digital still/video cameras), digital players (such as digital audio/video players), wearable devices (such as wearable cameras, smartwatches, and tracking devices), game consoles, digital book readers, telehealth telemedicine (remote healthcare medicine prescription) devices, communication-function-equipped vehicles or transportation (such as automobiles, airplanes and ships), and a combination of the above mentioned apparatuses of various kinds.

The communication apparatuses are not limited to portable or mobile apparatuses and thus include unportable or fixed apparatuses, devices, and systems of any kind, such as smart home devices (e.g., appliances, lighting equipment, smart meters or measuring instruments, and control panels), vending machines, and Internet of Things ("IoT"; every "things" that may exist on networks)).

In addition to data communication via cellular systems, wireless LAN systems, communication satellite systems and/or the like, communication includes data communication via a combination of these systems.

Further, the communication apparatuses include devices, such as controllers or sensors to be connected to or linked to a communication device which executes communication functions described in the present disclosure. Controllers or sensors are included, for example, each of which is configured to generate a control signal and/or a data signal used by the communication device which executes the communication functions of the communication apparatuses.

Further, the communication apparatuses include infrastructure equipment which performs communication with the above-mentioned non-limiting apparatuses of various kinds or which controls these non-limiting apparatuses of various kinds, such as base stations, access points, apparatuses of any other kinds, devices, and systems.

A transmission apparatus according to the present disclosure includes: determination circuitry, which, in operation, determines a repetition pattern of data for a terminal; and transmission circuitry, which, in operation, transmits the data repeatedly based on the repetition pattern, wherein the repetition pattern is associated with control information indicated to the terminal by dynamic signaling.

In the transmission apparatus according to the present disclosure, the repetition pattern includes at least a number of repetitions of the data, and as a number of resources allocated to the terminal is smaller, the number of repetitions is larger.

In the transmission apparatus according to the present disclosure, as a bandwidth allocated to the terminal is narrower, the number of repetitions is larger.

In the transmission apparatus according to the present disclosure, as a number of symbols allocated to the terminal is smaller, the number of repetitions is larger.

In the transmission apparatus according to the present disclosure, the repetition pattern includes at least a number of repetitions of the data, and as a subcarrier spacing configured for the terminal is wider, the number of repetitions is larger.

In the transmission apparatus according to the present disclosure, the repetition pattern further includes an RV order representing a transmission order of Redundancy Versions (RVs), and a number of RVs included in the RV order in each subcarrier spacing is equal to the number of repetitions configured for each subcarrier spacing.

In the transmission apparatus according to the present disclosure, the repetition pattern includes at least a transmission interval of the data transmitted repeatedly, and as a subcarrier spacing configured for the terminal is wider, the transmission interval is longer.

In the transmission apparatus according to the present disclosure, the repetition pattern includes at least an RV order representing a transmission order of Redundancy Versions (RVs), and as a subcarrier spacing configured for the terminal is wider, a change of RV pattern in the RV order is smaller.

In the transmission apparatus according to the present disclosure, the repetition pattern includes at least a number of repetitions of the data, and the number of repetitions is larger when an uplink channel type configured in the terminal is a non-SUL (Supplementary uplink) than when the uplink channel type is an SUL.

A reception apparatus according to the present disclosure includes: determination circuitry, which, in operation, determines a repetition pattern of data for a terminal; reception circuitry, which, in operation, receives the data that is transmitted repeatedly based on the repetition pattern; and decoding circuitry, which, in operation, combines the data repeatedly transmitted, wherein the repetition pattern is associated with control information indicated to the terminal by dynamic signaling.

A transmission method according to the present disclosure includes: determining a repetition pattern of data for a terminal; and transmitting the data repeatedly based on the repetition pattern, wherein the repetition pattern is associated with control information indicated to the terminal by dynamic signaling.

A reception method according to the present disclosure includes: determining a repetition pattern of data for a terminal; receiving the data that is transmitted repeatedly based on the repetition pattern; and combining the data repeatedly transmitted, wherein the repetition pattern is associated with control information indicated to the terminal by dynamic signaling.

The disclosure of Japanese Patent Application No. 2018-025857, filed on Feb. 16, 2018, including the specification, drawings, and abstract is incorporated herein by reference in its entirety.

INDUSTRIAL APPLICABILITY

One exemplary embodiment of the present disclosure is useful in mobile communication systems.

REFERENCE SIGNS LIST

100, 300 Base station
200, 400 Terminal
101, 301 Scheduler
102, 302 Control signal generator
103, 205, 303, 405 Repetition controller
104, 304 Control signal encoder/modulator
105, 406 Data encoder
106, 407 Retransmission controller
107, 408 Data modulator
108, 211, 305, 409 Radio resource allocator
109, 212, 306, 410 Transmitter
110, 201, 307, 401 Antenna
111, 202, 308, 402 Receiver
112, 203, 309, 403 Signal extractor
113 Demodulator/decoder
204, 404 Control signal demodulator/decoder
206, 310 Data demodulator
207, 311 Data combiner/decoder
208, 312 Error detector
209 Response signal generator
210 Encoder/modulator

The invention claimed is:

1. A transmission apparatus comprising:
   determination circuitry, which, in operation, determines a repetition pattern of data for a terminal; and
   transmission circuitry, which, in operation, transmits the data repeatedly based on the repetition pattern, wherein
   the repetition pattern is associated, via a predetermined correspondence relationship, with a parameter that is included in control information dynamically signaled to the terminal and that implicitly indicates the repetition pattern,
   the repetition pattern includes at least a transmission interval of the data transmitted repeatedly, and
   in response to a subcarrier spacing configured for the terminal becoming wider, the transmission interval becomes longer.

2. The transmission apparatus according to claim 1, wherein
   the repetition pattern includes at least a number of repetitions of the data, and
   as a number of resources allocated to the terminal is smaller, the number of repetitions is larger.

3. The transmission apparatus according to claim 2, wherein as a bandwidth allocated to the terminal is narrower, the number of repetitions is larger.

4. The transmission apparatus according to claim 2, wherein as a number of symbols allocated to the terminal is smaller, the number of repetitions is larger.

5. The transmission apparatus according to claim 1, wherein
   the repetition pattern includes at least a number of repetitions of the data, and
   as a subcarrier spacing configured for the terminal is wider, the number of repetitions is larger.

6. The transmission apparatus according to claim 5, wherein
   the repetition pattern further includes an RV order representing a transmission order of Redundancy Versions (RVs), and a number of RVs included in the RV order in each subcarrier spacing is equal to the number of repetitions configured for each subcarrier spacing.

7. The transmission apparatus according to claim 1, wherein
the repetition pattern includes at least an RV order representing a transmission order of Redundancy Versions (RVs), and
as a subcarrier spacing configured for the terminal is wider, a change of RV pattern in the RV order is smaller.

8. The transmission apparatus according to claim 1, wherein
the repetition pattern includes at least a number of repetitions of the data, and
the number of repetitions is larger when an uplink channel type configured in the terminal is a non-SUL (Supplementary uplink) than when the uplink channel type is an SUL.

9. A reception apparatus comprising:
determination circuitry, which, in operation, determines a repetition pattern of data for a terminal;
reception circuitry, which, in operation, receives the data that is transmitted repeatedly based on the repetition pattern; and
decoding circuitry, which, in operation, combines the data repeatedly transmitted, wherein
the repetition pattern is associated, via a predetermined correspondence relationship, with a parameter that is included in control information dynamically signaled to the terminal and that implicitly indicates the repetition pattern,
the repetition pattern includes at least a transmission interval of the data transmitted repeatedly, and
in response to a subcarrier spacing configured for the terminal becoming wider, the transmission interval becomes longer.

10. A transmission method comprising:
determining a repetition pattern of data for a terminal; and
transmitting the data repeatedly based on the repetition pattern, wherein
the repetition pattern is associated, via a predetermined correspondence relationship, with a parameter that is included in control information dynamically signaled to the terminal and that implicitly indicates the repetition pattern,
the repetition pattern includes at least a transmission interval of the data transmitted repeatedly, and
in response to a subcarrier spacing configured for the terminal becoming wider, the transmission interval becomes longer.

11. A reception method comprising:
determining a repetition pattern of data for a terminal;
receiving the data that is transmitted repeatedly based on the repetition pattern; and
combining the data repeatedly transmitted, wherein
the repetition pattern is associated, via a predetermined correspondence relationship, with a parameter that is included in control information dynamically signaled to the terminal and that implicitly indicates the repetition pattern,
the repetition pattern includes at least a transmission interval of the data transmitted repeatedly, and
in response to a subcarrier spacing configured for the terminal becoming wider, the transmission interval becomes longer.

* * * * *